US011600291B1

(12) United States Patent
Lan et al.

(10) Patent No.: US 11,600,291 B1
(45) Date of Patent: *Mar. 7, 2023

(54) DEVICE SELECTION FROM AUDIO DATA

(71) Applicant: Amazon Technologies, Inc., Seattle, WA (US)

(72) Inventors: Gang Lan, Santa Clara, CA (US); Joseph Pedro Tavares, Kenmore, WA (US); Deepak Uttam Shah, Milpitas, CA (US); Mckay Clawson, Milpitas, CA (US); Vijay Shankar Tennety, Milpitas, CA (US); Ravi Kiran Rachakonda, San Jose, CA (US); Venkata Snehith Cherukuri, San Jose, CA (US); Charles James Torbert, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 252 days.

This patent is subject to a terminal disclaimer.

(21) Appl. No.: 16/900,593

(22) Filed: Jun. 12, 2020

Related U.S. Application Data

(63) Continuation of application No. 15/926,507, filed on Mar. 20, 2018, now Pat. No. 10,685,669.

(51) Int. Cl.
G10L 15/00 (2013.01)
G10L 25/51 (2013.01)
G10L 25/03 (2013.01)
G10L 15/18 (2013.01)
G06F 3/16 (2006.01)

(52) U.S. Cl.
CPC .............. *G10L 25/51* (2013.01); *G06F 3/167* (2013.01); *G10L 15/18* (2013.01); *G10L 25/03* (2013.01)

(58) Field of Classification Search
CPC ............................. G10L 15/265; G10L 15/32
See application file for complete search history.

(56) References Cited

U.S. PATENT DOCUMENTS 11,218,855 B2 * 1/2022 Luff .................... G06Q 20/321
2009/0204409 A1 8/2009 Mozer et al.
2012/0191449 A1 7/2012 Lloyd et al.
(Continued)

OTHER PUBLICATIONS

Non Final Office Action dated Sep. 23, 2019 for U.S. Appl. No. 15/926,507 "Device Selection From Audio Data" Lan, 9 pages.

*Primary Examiner* — Daniel Abebe
(74) *Attorney, Agent, or Firm* — Lee & Hayes, P.C.

(57) ABSTRACT

This disclosure describes techniques for identifying a voice-enabled device from a group of voice-enabled devices to respond to a speech utterance of a user. A speech-processing system may receive an audio signal representing the speech utterance captured in an environment of a voice-enabled device, and identify another voice-enabled device located in the environment. The system may analyze the audio signal using a different natural-language-understanding model for each of the voice-enabled devices to identify an intent for each of the voice-enabled devices to respond to the speech utterance. The system may determine confidence scores that the intents are responsive to the speech utterance, and select the intent with the highest confidence score. The system may use the selected intent to generate a command for the corresponding voice-enabled device to respond to the user.

20 Claims, 10 Drawing Sheets

(56) References Cited

U.S. PATENT DOCUMENTS

| | | |
|---|---|---|
| 2015/0088518 A1 | 3/2015 | Kim et al. |
| 2016/0042748 A1* | 2/2016 | Jain .................. G10L 15/30 704/9 |
| 2016/0217785 A1* | 7/2016 | Kennewick ............ G10L 15/24 |
| 2018/0228006 A1 | 8/2018 | Baker et al. |
| 2018/0332118 A1 | 11/2018 | Phipps et al. |
| 2019/0013025 A1 | 1/2019 | Alcorn et al. |

\* cited by examiner

DEVICE SELECTION FROM AUDIO DATA

RELATED APPLICATIONS

This application claims priority to and is a continuation of U.S. patent application Ser. No. 15/926,507, filed on Mar. 20, 2018, the entire contents of which are incorporated herein by reference.

BACKGROUND

As the capabilities of computing devices continue to evolve, many different ways have been introduced to allow users to interact with computing devices, such as through mechanical devices (e.g., keyboards, mice, etc.), touch screens, motion, and gesture. Many computing devices are now capable of receiving and responding to voice commands, including tablets, televisions, entertainment systems, and portable communication devices. In some instances, a number of these voice-enabled computing devices may be in proximity to a user to such that each voice-enabled computing device detects a voice command from the user. Each of the voice-enabled devices may detect the voice command and process the voice command to perform the task for the user. This may result in multiple voice-enabled devices performing the same task for a user. The technology and other innovation described herein provides, among other things, an improved user experience.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
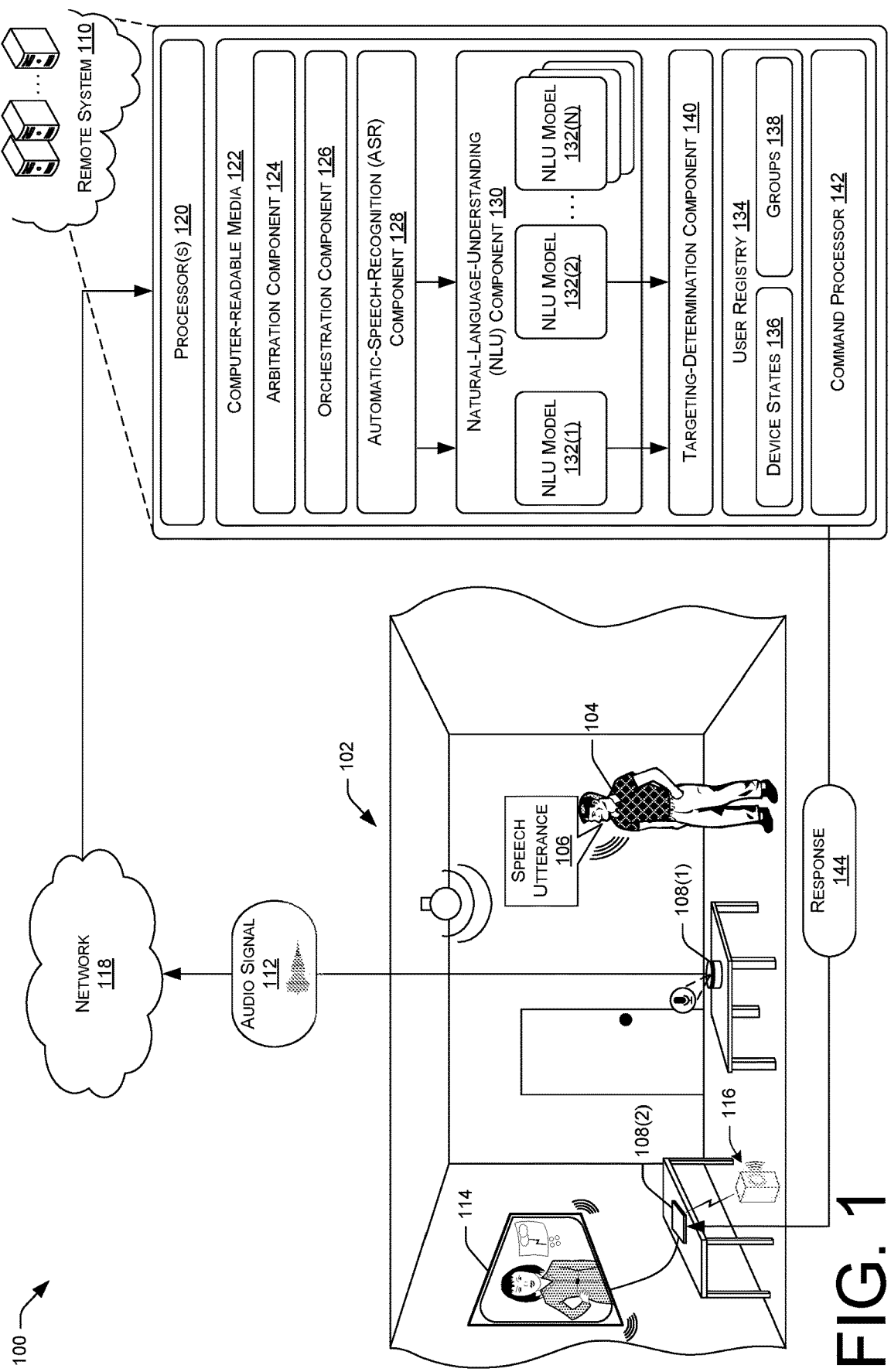
FIG. 1 illustrates a schematic diagram of an illustrative environment, including two voice-enabled devices, in which a user issues a speech utterance, at least one of the voice-enabled devices detect the speech utterance, and a remote speech-processing system performs bifurcated processing to determine which of the voice-enabled devices will respond to the speech utterance.

With the proliferation of voice-enabled computing devices, or "voice-enabled devices," users are able to interact with more of their computing devices through speech. For instance, a user may issue a command via a speech utterance to a voice-enabled device to perform an operation, such as turning on/off an appliance, streaming music, adding an item to a shopping list, etc. Due to the usefulness of these voice-enabled devices, users often have multiple devices in an environment, such as their home. While multiple voice-enabled devices may increase user satisfaction by allowing a user to issue speech utterances including commands throughout their home, in situations where multiple voice-enabled devices are near each other, such as within a single room or in adjoining rooms, various issues may arise when determining which of the voice-enabled devices is to respond to the speech utterance. For example, if each of the voice-enabled devices detects the same user utterance, each device may independently attempt to process and respond to the user utterance as if it were two separate utterances. Various device arbitration rules may be used to select a voice-enabled device from among multiple devices to "listen to" and/or respond to the utterance. The techniques described herein provide improved techniques for identifying an appropriate voice-enabled device for responding to the speech utterance. The techniques described herein may be particularly applicable for vague or ambiguous speech utterances which do not explicitly indicate which voice-enabled device to control.

Often, when two (or more) voice-enabled devices in the same physical environment each detect a speech utterance from a user, device-arbitration systems may identify which voice-enabled device is to continue to "listen" to, or capture, the speech utterance, and also determine which voice-enabled device is to perform an action responsive to a command in the speech utterance, based on various types of contextual data. In an example where two voice-enabled devices each detect a speech utterance, device-arbitration systems may analyze signal-to-noise (SNR) values corresponding to audio signals received from each of the two voice-enabled devices, and the device whose audio signal has the best SNR value may be selected to "listen" to the speech utterance (e.g., capture audio data representing the speech utterance). In this way, the voice-enabled device that the user is nearest to, and/or facing, may be selected to listen to, or capture, the speech utterance. However, certain types of voice-enabled devices may be configured to control secondary devices that output sound, such as televisions, speakers, entertainment systems, and so forth. In situations where this type of voice-enabled device is positioned near the sound emitting secondary devices, the SNR values for audio signals generated by this voice-enabled device may be relatively poor, or the voice-enabled device may not even detect the speech utterance over the sound emitted by the nearby secondary devices. If the voice-enabled device that controls the secondary devices does not detect the speech utterance, or has a poor SNR ratio, then certain arbitration rules may select voice-enabled devices near the user with higher SNR ratios to respond to the speech utterance. However, it may be likely that the user is intending to have the voice-enabled device control the secondary devices, such as by causing the secondary device to change a song/movie, lowering the volume, etc. Thus, additional types of data may be utilized to determine which voice-enabled device is to respond to a speech command, regardless of which voice-enabled device actually "heard" or captured the speech command.

Described herein are, at least in part, techniques including bifurcated processing of an audio signal that represents a speech utterance using multiple audio-signal processing pipelines to select an appropriate voice-enabled device, from among multiple voice-enabled devices in a same physical environment, to perform an action responsive to a command included in the speech utterance. The techniques described herein may be applicable in various scenarios, including scenarios where multiple voice-enabled devices are positioned in the same physical environment (e.g., the same house, the same room in a house, etc.) to detect speech utterances of a user. For example, a voice-enabled device positioned in an environment may detect a speech utterance (hereinafter "source voice-enabled device") from a user and use a microphone to generate an audio signal representing the speech utterance. Further, a different voice-enabled device (hereafter "secondary voice-enabled device") also positioned in the environment may be positioned near, and potentially controlling, secondary devices (e.g., televisions, entertainment-system speakers, etc.) that are outputting sound such that the secondary voice-enabled device is unable to detect and generate an audio signal representing the speech utterance (or generate an audio signal with poor SNR ratios) due to the sound. In such examples, the audio signal generated by the source voice-enabled device may be processed using automatic speech recognition (ASR) to convert the audio signal into text data that includes one or more textual words corresponding to the speech utterance.

While the text data generated using ASR may represent words of the speech utterance, further natural-language processing may be required to determine an intent of the speech utterance, an appropriate response to the speech utterance, and an appropriate voice-enabled device to respond to the speech utterance (hereinafter "target voice-enabled device"). For example, natural-language understanding (NLU) may be used with the text data to identify an intent of the speech utterance. While using generalized NLU techniques and the text data to determine an intent of the user may be appropriate when identifying a target voice-enabled device from a group of voice-enabled devices that have similar device capabilities, these generalized NLU techniques may break down when selecting a target voice-enabled device from multiple voice-enabled devices with different device capabilities.

While voice-enabled devices may perform some types of pre-processing, often voice-enabled devices may have relatively low functionality. For instance, voice-enabled devices may comprise battery powered devices which are configured to merely serve as an interface or "middle man" between a remote system and a user. In this way, the more intensive processing involved in the speech-processing techniques may be performed using large amounts of resources of remote systems, which may extend battery life performance of voice-enabled devices. For example, the voice-enabled devices may be configured with components for performing pre-processing on an audio signal representing a speech utterance, such as beamforming and wake word detection. However, the voice-enabled devices may relay the audio signals to a speech-processing system which performs processing techniques on the audio signals to determine an intent for a target voice-enabled device from among multiple voice-enabled devices.

Thus, in some examples, some or all of the techniques described herein may be performed by a speech-processing system (e.g., "cloud-based system," "software-as-a-service (SaaS)," "network-accessible platform," "remote system," etc.) which receives data from the voice-enabled devices. Each of the voice-enabled devices may access the remote speech-processing system through a communications network, such as the internet, to provide the speech-processing system with the captured audio signals, and potentially other types of contextual information detected or determined by the voice-enabled devices (e.g., device states, SNR values, etc.). In various examples, the voice-enabled devices may receive a "wake" trigger (e.g., wake word, button input, etc.) which indicates to the voice-enabled devices that a user is speaking a command, and the voice-enabled devices begin streaming the audio signals representing the spoken command to the remote speech-processing system. Accordingly, the speech-processing system (hereinafter "remote system") may perform some, or all, of the techniques described herein and include one or more components to perform various ASR and NLU processing on the received audio signals, to identify a target device, and to determine an intent for the target device to respond to the speech utterance.

Continuing the example from above, the source voice-enabled device and the secondary voice-enabled device may have different device capabilities. For example, the source voice-enabled device may include device capabilities for streaming music, ordering items online, setting timers, and so forth. The secondary voice-enabled device may include additional device capabilities, such as controlling secondary devices including televisions, speakers, entertainment systems, and so forth. In light of this, the techniques described herein include the use of device-specific, NLU models to determine intents that are appropriate for the capabilities of the different voice-enabled devices. In some examples, the NLU models may comprise machine-learning models that are trained or configured to analyze text data with different sets of rules, or "biases," to identify intents for the text data that are appropriate for the device capabilities of the voice-enabled devices.

An NLU model for the source voice-enabled device may be biased such that text data representing speech utterances is analyzed to determine intents which are tailored for the device capabilities of the source voice-enabled device, such as music steaming intents, shopping intents, alarm/timer intents, etc. Conversely, an NLU model for the secondary voice-enabled device may be trained or biased such that text data representing speech utterances is analyzed to determine intents which are tailored for the device capabilities of the secondary voice-enabled device, such as video steaming intents, music intents, etc. In this way, more ambiguous speech utterances that may be analyzed by the different NLU models may result in different intents depending on which of the source or secondary voice-enabled device is used as a target device. For instance, the remote system may analyze text data representing a speech utterance of "bread" using an NLU model of the source voice-enabled device and determine an intent for the source voice-enabled device to add a loaf of bread to a shopping list. Conversely, the remote system may analyze the same text data using an NLU model of the secondary voice-enabled device to determine an intent for the secondary voice-enabled device to begin streaming a documentary about the rock band "Bread" on a television that is controlled by the secondary voice-enabled device.

Thus, the techniques described herein may include receiving, at the remote system, an audio signal representing a speech utterance of a user, converting the audio data into text data using ASR, and using the text data as inputs into two (or more) NLU models which are trained, or biased, to identify intents appropriate for devices, or device profiles, associated with the NLU models. Upon receiving the two intents from the two NLU models, the remote system may arbitrate between the two intents using various data to determine which intent is appropriate for responding to the speech utterance. Stated otherwise, the remote system may determine whether an intent determined, using a first NLU model, for the source voice-enabled device is more appropriate to use for responding to the speech utterance compared to an intent determined, using a second NLU model, for the secondary voice-enabled device.

In some examples, the remote system may arbitrate the multiple intents using various types of data. For example, the voice-enabled devices may send device-state data to the remote system that indicates a current state of the device, or what the device is current doing (e.g., streaming music, playing a movie, idle, etc.). In some examples, the device-state data may be sent, or determined, based on speech utterances that are processed at the remote system. For instance, if the source voice-enabled device had recently sent an audio signal representing a speech utterance requesting that the source voice-enabled device add items to a shopping list, the remote system may store device-state data for the source voice-enabled device indicating a recent and/or current shopping-session state. Thus, when the source voice-enabled device sends a subsequent audio signal representing the speech utterance of "bread", the remote system may determine that it is more likely the user is requesting that the source voice-enabled device add a loaf of bread to the shopping list based on the device-state data. As another example, the source voice-enabled device may have previously sent an audio signal representing a speech utterance of "play a documentary about David Gates," and the remote system may have in turn sent a command to the secondary voice-enabled device to cause an associated television to stream a documentary about David Gates (the lead singer of the band "Bread"). The remote system may then store device-state data for the secondary voice-enabled device indicating that it is streaming a documentary about David Gates, and upon receiving the audio signal representing the speech utterance "Bread," the remote system may determine, based on the device-state data, that the user is requesting the secondary voice-enabled device stream a documentary about the band Bread.

Thus, the remote system may use device-state data of the voice-enabled devices in order to determine which of the two intents is appropriate for responding to the speech utterance, generate a command based on the selected intent, and send the command to the voice-enabled device whose intent was selected (e.g., the target device). Other types of data may be used to select a target voice-enabled device, as described in more detail below.

In this way, when a user issues a speech utterance in an environment including multiple voice-enabled devices, a system that processes audio signals representing the speech utterance may utilize the techniques described herein to help determine an appropriate voice-enabled device from the multiple devices for responding to the user. Thus, the techniques described herein improve the capabilities of voice-enabled device and speech-processing systems by increasing the likelihood that an appropriate voice-enabled device responds to a user. This further improves the functioning of voice-enabled devices and speech-processing systems by improving their ability to process speech utterances and respond appropriately. Thus, the technology-specific improvements described herein may increase the satisfaction of user's that interact with voice-enabled devices, similar to the way that increased processing power, increase memory, and other types of increases in computing device capabilities increase user satisfaction and device performance.

In some examples, one or more of the above-noted processes may be performed in parallel to reduce latency time. For example, multiple NLU models may process text data at least partially in parallel to reduce latency time between the user issuing a command in a speech utterance, and an appropriate device responding to the speech utterance.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram 100 of an illustrative environment 102 in which a user 104 issues a speech utterance 106, voice-enabled devices 108(1) and 108(2) (collectively "voice-enabled devices 108") detect the speech utterance 106, and a remote system 110 performs bifurcated processing on an audio signal 112 representing the speech utterance 106 to determine which of the voice-enabled devices 108 will respond to the speech utterance 106.

In the example of FIG. 1, the voice-enabled device 108(1) may detect the speech utterance 106 and generate the audio signal 112 representing the speech utterance 106. Thus, the voice-enabled device 108(1) may be a "source voice-enabled device" as it detects the speech utterance 106, generates the audio signal 112 representing the speech utterance 106 using a microphone, and transmits the audio signal 112 to the remote system 110 for further processing. As illustrated, the source voice-enabled device 108(1) may be closer to the user 104, and the voice-enabled device 108(2) may far enough away from the user 104 to not be able to detect the speech utterance 106. In some examples, the voice-enabled device 108(2) may control various secondary devices, such as a television 114 (or other display device), and a speaker 116. The voice-enabled device 108(2) may be connected using wired connections (e.g., USB, HDMI, etc.) with secondary devices, such as the television 114, and/or wirelessly connected (e.g., Bluetooth, ZigBee, etc.) with the secondary devices, such as the speaker 116, and the voice-enabled device 108(2) may control operations of the secondary devices 114 and 116 based on commands included in the speech utterances 106 that are processed by the remote system 110.

In such examples, the voice-enabled device 108(2) (hereinafter "secondary voice-enabled device 108(2)") may be positioned bear the sound emitting secondary devices 114 and 116 such that the secondary voice-enabled device 108(2) is unable to detect the speech utterance 106, or generate an audio signal that includes the speech utterance 106 with poor SNR values. Accordingly, the secondary voice-enabled device 108(2) may be unable to detect the speech utterance 106, or be configured to refrain from sending audio signals 112 representing the speech utterance 106 due to poor SNR values. For instance, if it is determined that the secondary voice-enabled device 108(2) is in the environment of the source voice-enabled device 108(1), the remote system 110 may send a command to the secondary voice-enabled device 108(2) to configure the device 108(2) to refrain from detecting speech utterances 106. In this way, the source voice-enabled device 108(1) may detect speech utterances 106 and send audio signals 112 to the remote system 110 on behalf of the secondary voice-enabled device 108(2).

In some examples, the voice-enabled devices 108 may each have one or more microphones that are used to capture user speech, such as speech utterance 106, and one or more speakers that are used to play speech (e.g., dialogue) and content. In some embodiments, the voice-enabled devices 108 may be designed to operate from a fixed location, and in other embodiments, the voice-enabled devices 108 may be portable or mobile. For instance, the voice-enabled devices 108 may comprise handheld devices or other mobile devices, such as smartphones, tablet computers, media players, personal computers, wearable devices, various types of accessories, and so forth.

As shown in the environment 102, the user 104 is interacting with the voice-enabled devices 108 through a speech utterance 106. For example, the voice-enabled devices 108 may receive spoken commands from the user 104 via the speech utterance 106, and provide services in response to the commands. In some examples, the voice-enabled devices 108 may detect a predefined trigger expression or word (e.g., "awake"), which may be followed by instructions or directives (e.g., "please end my phone call," "please turn off the alarm," "please play my favorite movie," etc.). Services provided by the voice-enabled devices 108 in conjunction with the remote system 110 may include performing actions or activities, rendering media, obtaining, and/or providing information, providing information via generated or synthesized speech via the voice-enabled devices 108, initiating Internet-based services on behalf of the user 104, and so forth.

The voice-enabled devices 108 may receive or capture sound corresponding to the speech utterance 106 of the user via one or more microphones. In certain implementations, the speech utterance 106 may include or be preceded by a wakeword or other trigger expression or event that is spoken by the user 104 to indicate that subsequent user speech is intended to be received and acted upon by the voice-enabled devices 108 and/or remote system 110. The voice-enabled devices 108 may detect the wakeword and begin streaming audio signals to the remote system 110. In some instances, the voice-enabled devices 108 may operate in a low-functionality mode and analyze sound using ASR processing. When the wakeword is detected using ASR, the voice-enabled devices 108 may begin streaming the audio signal, and other data, to the remote system 110. The wakeword may be a reserved keyword that is detected locally by the voice-enabled devices 108, such as by using an expression detector that analyzed audio signals produced by the microphones of the voice-enabled devices 108 using ASR techniques to detect the wakeword, which generally may be a predefined word, phrase, or other sound. Such an expression detector may be implemented using keyword spotting technology, as an example. A keyword spotter is a functional component or algorithm that evaluates an audio signal to detect the presence a predefined word or expression in the audio signal 112. Rather than producing a transcription of the words of the speech, a keyword spotter generates a true/false output to indicate whether or not the predefined word or expression was represented in the audio signal.

In the example illustrated in environment 102, the user 104 issues a speech utterance 106 subsequent to a wakeword, which one or both of the voice-enabled devices 108(1) and 108(2) detect or capture. However, as described above, secondary voice-enabled device 108(2) may not detect the speech utterance, or be configured to refrain from detecting speech utterances 106 due to poor SNR values or other reasons (e.g., higher power consumption when "waking up"). While both of the voice-enabled devices 108(1) and 108(2) may produce audio signal 112 representing the speech utterance 106, the source voice-enabled device 108(1) may generate the audio signal 112 in the example shown. Additionally, the voice-enabled devices 108(1) and 108(2) may each determine various audio signal metric values (e.g., SNR values), or determine additional metadata associated with the speech utterance 106. Such metadata may include proximity data, such as physical proximity of the user 104 relative to each of the voice-enabled devices 108, and temporal proximity, such as a time when the speech utterance 106 was detected by each of the voice-enabled devices 108. The metadata may also include snapshots which indicate device states of the voice-enabled devices 108. The snapshots may comprise device states which indicate current activities or operations of the voice-enabled devices 108 before, during, and/or after the speech utterance 106 is detected by the voice-enabled devices 108. Device states of the voice-enabled devices 108 may include, for example, conducting a telephone call, outputting an alarm sound, streaming audio (e.g., music, audio books, etc.), conducting a dialogue with user 104, performing online searches, controlling secondary devices 114 and/or 116 in a house, or any other type of activity for which a voice-enabled device 108 can be configured to perform. The snapshot may generally represent a state of the voice-enabled device 108(2) as controlling or causing the secondary devices 114 and 116 to output audio and/or video. Conversely, the snapshot of the device state for the voice-enabled device 108(1) indicates that the device 108(1) is not in any active state other than streaming the audio signal 112(1).

While the snapshots of the devices states may be sent up to the remote system 110 when a speech utterance is detected 106, in other examples, the remote system 110 may also store indications of devices states rather than receiving them each time an audio signal 12 is received. For example, the remote system 110 may receive an indication that the user 104 set an alarm, and know what time the alarm will sound. Thus, once the alarm is sounding, the remote system 110 may already have the devices states stored and does not receive the snapshots every time a speech utterance 106 is detected. Similarly, some or all of the metadata may be stored at the remote system 110 prior to the speech utterance 106 being captured by the voice-enabled devices 108(1) and/or 108(2).

In various examples, the audio signal 112 and the additional metadata may be sent to the remote system 110 over one or more networks 118. The one or more networks 118 may include any viable communication technology, such as wired and/or wireless modalities and/or technologies. Networks 118 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)— both centralized and/or distributed—and/or any combination, permutation, and/or aggregation thereof.

The remote system 110 may process audio signals 112 received from the voice-enabled devices 108 and formulate responses to the user 104 along with determining which of the voice-enabled devices 108 is to perform an action responsive to a command in the speech utterance 106. The remote system 110 may be implemented as one or more computing devices including one or more servers, desktop computers, laptop computers, or the like. In one example, the remote system 110 is configured in a server cluster, server farm, data center, mainframe, cloud computing environment, or a combination thereof. To illustrate, the remote system 110 may include any number of devices that operate as a distributed computing resource (e.g., cloud computing, hosted computing, etc.) that provides services, such as storage, computing, networking, and so on.

In some examples, the remote system 110 may include one or more processors 120 and computer-readable media 122 storing various components for determining which of the voice-enabled devices 108 is to respond to a command in the speech utterance 106. For example, the computer-readable media 122 may include an arbitration component 124 which performs various initial arbitration techniques. In examples where the both the source voice-enabled device 108(1) and the secondary voice-enabled device 108(2) each transmit an audio signal 112 representing the speech utterance 106 to the remote system 110, the arbitration component 124 may determine which of the audio signals 112 to process. For instance, the arbitration component 124 may analyze attributes of the audio signals 112, such as signal-to-noise values, voice-activity detection values, or other values which indicate the strength of presence of the speech utterance 106 in each of the audio signals 112. The arbitration component 124 may determine which audio signal 112 has the stronger signal attributes, and stop the voice-enabled device 108 generating the audio signal 112 with the weaker representation of the speech utterance 106 from transmitting the audio signal 112. In this way, an audio signal 112 is selected which has the strongest representation of the speech utterance 106, which may be advantageous for later processing, such as more accurate ASR techniques to generate text data that more accurately corresponds to the speech utterance 106.

The computer-readable media 122 may further store an orchestration component 126 that calls or communicates with an automatic speech recognition (ASR) component 128, and a natural language understanding (NLU) component 130 for processing the audio signal 112. For example, the orchestration component 126 may stream the audio signal 112 to the ASR component 128, which detects the speech utterance 106 endpoint and sends a message to the source voice-enabled device 108(1) to close the stream of the audio signal 112. In some instances, the ASR component 128 of the remote system 110 may process the one or more audio signals 112 at to determine textual data which corresponds to the speech utterance 106. In some examples, the ASR component 128 may generate ASR confidence scores representing the likelihood that a particular set of words of the textual data matches those spoken in the speech utterance 106. For instance, the ASR component 128 may determine a confidence or likelihood that a particular word which matches the sounds would be included in the sentence at the specified location (e.g., using a language or grammar model). Thus, each potential textual interpretation of the spoken utterance 106 (hypothesis) is associated with an ASR confidence score. The ASR component 128 may then return the textual data to the orchestration component 126.

In various examples, the textual data corresponding to the speech utterance 106 may be sent from the orchestration component 126 and/or ASR component 128 to the NLU component 130 to be analyzed or processed by the NLU component 130 to determine an intent expressed by the user 104 in the speech utterance 106. In some examples, the NLU component 130 may include multiple NLU models 132(1), 132(2), and 132(N) (collectively "NLU models 132"). Generally, the NLU models 132 may each correspond to different voice-enabled devices 108, or device profiles of the different types of voice-enabled devices 108. The NLU models 132 may include machine-learning models which have been trained using different training speech utterances to result in an NLU model 132 that weights, or biases, the processing of text data to identify intents for the text data that are more appropriate for the device capabilities of the corresponding voice-enabled device 108.

For example, an NLU model 132(1) may include a machine-learning model that has been trained to process text data and identify or determine intents that correspond to operations or actions that are performable by the source voice-enabled device 108(1) based on device capabilities of the source voice-enabled device 108(1). As an example, the source voice-enabled device 108(1) may include device capabilities for streaming music, ordering items online, setting timers, and so forth. Thus, the NLU model 132(1) may be trained or biased such that text data that is input to the NLU model 132(1) will map to intents for performing operations based on those device capabilities. In some examples, the voice-enabled devices 108 may be associated with a "device profile" used to determine which NLU model 132(1) should be used for identifying intents and corresponding commands for that voice-enabled device 108. Thus, for the source voice-enabled device 108(1), the associated NLU model 132(1) may be biased such that text data representing speech utterance 106 is analyzed to determine one or more intents which are tailored for the device capabilities of the source voice-enabled device 108(1), such as music steaming intents, shopping intents, alarm/timer intents, etc. Similarly, the secondary voice-enabled device 108(2) may be associated with the NLU model 132(2), or have a device profile that is associated with the NLU model 132(2). The NLU model 132(2) may similarly include a machine-learning model that has been trained to determine one or more intents which are tailored for the device capabilities of the secondary voice-enabled device 108(2). For example, the secondary voice-enabled device 108(2) may include additional device capabilities, such as controlling secondary devices including televisions 114, speakers 116, entertainment systems, and so forth. The NLU model 132(2) for the secondary voice-enabled device 108(2) may be trained or biased such that text data representing the speech utterance 106 is analyzed to determine intents which are tailored for the device capabilities of the secondary voice-enabled device 108(2), such as video steaming intents, music intents, etc. Following the example described above, the NLU model 132(1) may analyze text data representing a speech utterance 106 of "bread," and determine an intent for the source voice-enabled device 108(1) to add a loaf of bread to a shopping list. Conversely, the NLU model 132(2) may be used to analyze the same text data to determine an intent for the secondary voice-enabled device 108(2) to begin streaming a documentary about the rock band "Bread" on the television 114.

Accordingly, the NLU component 130 may independently analyze the text data representing the speech utterance 106 using multiple NLU models 132 to identify an intent from each of the NLU models 132. As noted above, in some examples a single source voice-enabled device 108(1) may detect the speech utterance 106 and transmit the audio signal 112. Accordingly, the orchestration component 126 may, prior to sending the text data to the NLU component 130, determine if additional NLU models 132 need to be used to analyze the text data other than the NLU model 132(1) that corresponds to the source voice-enabled device 108(1). The orchestration component 126 may analyze a user registry 134 that stores indications of what voice-enabled devices 108 are registered with a particular user account, and also includes indications of device-state data 136 indicating devices states of the registered voice-enabled devices 108, as well as stored groupings 138 of devices 108, or device profiles associated with the devices 108. For example, the orchestration component 126 may determine a device profile of the source voice-enabled device 108(1) based on receiving the audio signal 112 from the source voice-enabled device 108(1), and analyze the stored groups 138 to determine whether the device profile of the source voice-enabled device 108(1) is indicated as being part of a group with other voice-enabled devices 108. The groups 138 may indicate that the device profile of the source voice-enabled device 108(1) is grouped with a device profile of the secondary voice-enabled device 108(2). For instance, the orchestration component 126 may determine that devices profiles for the voice-enabled devices 108(1) and 108(2) are stored in a group that indicates that the two devices are in the same environment 102, such as a same room or adjoining rooms in a house. In this way, the orchestration component 126 may use the groups 138 to determine that the secondary voice-enabled device 108(2) is in the same environment 102 of the source voice-enabled device 108(1) despite not receiving an audio signal 112 from the secondary voice-enabled device 108(2).

Thus, the groups 138 may be used to ensure that voice-enabled devices 108 in a same physical environment are considered for being identified as the target voice-enabled device 108 that performs an operation responsive to the speech utterance 106 regardless of whether the devices 108 detected the speech utterance 106. Further, the orchestration component 126 may provide an indication of the device profiles of the voice-enabled devices 108 to the NLU component 130, and the NLU component 130 may in turn identify NLU models 132 associated with the device profiles, and process the text data using each of the identified NLU models 132 to identify intents for each of the voice-enabled devices 108 in the group 138 with the source voice-enabled device 108(1).

Upon identifying intents for each of the voice-enabled devices 108 in the grouping 138 of the source voice-enabled device 108(1) (e.g., the secondary voice-enabled device 108(2)), the orchestration component 126 and/or NLU component 130 may provide the intents to a targeting-determination component 140. The targeting-determination component 140 may comprise a library which executes various rules to determine which of the voice-enabled devices 108(1) or 108(2) is to be the target device to respond to the speech utterance. In some examples, the targeting-determination component 140 may analyze different data and determine confidence scores for each of the intents which indicates a confidence, or likelihood, that the particular intent is the responsive to the speech utterance. For example, the targeting-determination component 140 may determine a confidence score that the intent determined for the source voice-enabled device 108(1) using the NLU model 132(1) is an appropriate intent for the speech utterance 106. Similarly, the targeting-determination component 140 may determine another confidence score that the intent determined for the secondary voice-enabled device 108(2) using the NLU model 132(2) is an appropriate intent for the speech utterance 106. The targeting-determination component 140 may determine which of the confidence scores is higher, and select the intent with the higher confidence score. The intent with the highest confidence score may then be used to determine a command to cause the associated voice-enabled device 108 to perform an operation responsive to the speech utterance 106.

In some examples, the targeting-determination component 140 may use information about the device states 136 of the two voice-enabled devices 108 to determine the confidence scores for the intents associated with each of the voice-enabled devices. For example, a voice-enabled device 108 whose device state 136 is "idle," meaning the device 108 is not performing any operations other than listening for a speech utterance 106, a confidence score for the intent associated with that voice-enabled device 108 may be lower. Conversely, a voice-enabled device 108 whose device state 126 is "active," or performing an operation of some kind (e.g., streaming music, performing a telephone call, etc.), then the confidence score for the intent associated with that voice-enabled device 108 may be higher.

As noted above, the remote system 110 may store indications of the device states 136 as the voice-enabled devices 108 transition through different device states 136. For instance, if the remote system 110 previously received an audio signal from the source voice-enabled device 108 indicating a request to set an alarm for a future time, the remote system 110 may store a device state 136 for the source voice-enabled device 106 of being set for an alarm time. Thus, if the source voice-enabled device 106 sends a subsequent audio signal 112 representing a speech utterance to "please turn off," the targeting-determination component 140 may use the device state 136 of the source voice-enabled device to determine that an intent output from the NLU model 132(1) to turn off the alarm has a high confidence score. Thus, the targeting-determination component 140 may give higher confidence scores to intents associated with voice-enabled devices 108 who have devices states 136 that indicate the corresponding voice-enabled device is able of performing an operation for the intent. Considering another example where the secondary voice-enabled device 108(2) has a device state 136 of "streaming music data" through the speaker 116, and the source voice-enabled device 108(1) has a device state 126 of "idle," an intent determined for a speech utterance 106 of "next song" using the NLU model 132(2) to move play a different song on the speaker 116 may have a higher confidence score than an intent determined using the NLU model 132(1) for the source voice-enabled device 108(1) to perform an operation.

Continuing the more detailed example from above, the source voice-enabled device 108(1) may have recently sent another audio signal 112 representing a speech utterance 106 requesting that the source voice-enabled device 108(1) add items to a shopping list. The remote system 110 may store device-state data 136 for the source voice-enabled device 108(1) indicating a recent and/or current "shopping-session state." Thus, if the source voice-enabled device 108(1) sends a subsequent audio signal 112 representing the speech utterance 106 of "bread", the targeting-determination component 140 may determine that an intent determined using the NLU model 132(1) for the source voice-enabled device 108(1) to add a loaf of bread to the shopping list based on the device-state data 126 has a high confidence score. As another example, the source voice-enabled device 108(1) may have previously sent an audio signal 112 representing a speech utterance 106 of "play a documentary about David Gates," and the targeting-determination component 140 may have in turn sent a command to the secondary voice-enabled device 108(2) to cause an associated television to stream a documentary about David Gates (the lead singer of the band "Bread"). The remote system 110 may then store device-state data 136 for the secondary voice-enabled device 108(2) indicating that the device 108(2) is streaming a documentary about David Gates. Upon receiving the audio signal 112 representing the speech utterance 106 "Bread," the targeting-determination component 140 may determine, based on the device-state data 136, that an intent output by the NLU model 132(2) to cause the secondary voice-enabled device 108(2) to stream a documentary about the band Bread may have a relatively high confidence score. In this way, the targeting-determination component 140 may utilize device-state data 136 about the voice-enabled devices 108 to assign confidence scores to intents that the respective voice-enabled devices 108 are to be the target voice-enabled device 108. In some examples, if a devices states 136 illustrate that the current state of a particular voice-enabled device 108 is such that the voice-enabled device 108 is able to perform an operation corresponding to a determined intent for the device 108, then the intent that the device 108 perform the operation may be relatively high. For instance, an intent determined for a voice-enabled device 108 to hang up a phone call may have a high confidence score when the device state 136 indicates that the voice-enabled device is performing a phone call.

In some examples, the targeting-determination component 140 may, additionally or alternatively, use other types of data when determining confidence scores for each of the intents output from the NLU models 132. For example, in a scenario where both of the voice-enabled devices 108(1) and 108(2) detect the speech utterance 106 and send audio signals 112 to the remote system, the targeting-determination component 140 may analyze metadata associated with those audio signals 112. For instance, the targeting-determination component 140 may analyze signal-to-noise (SNR) values corresponding to the audio signals 112 received from each of the voice-enabled devices 108(1) and 108(2), and the targeting-determination component 140 may assign a higher confidence score to the device 108 whose audio signal 112 has the better SNR value. As another example, each of the voice-enabled devices 108 may have calculated, using one or more voice-activity-detection (VAD) techniques, the level of voice presence in their audio signals 112 by analyzing portions of the audio signals 112 to evaluate features such as signal energy and frequency distribution. The features are quantified and compared to reference features corresponding to reference signals that are known to contain human speech. The comparison produces a score corresponding to the degree of similarity between the features of the audio signal and the reference features. The score is used as an indication of the detected or likely level of speech presence in the audio signal 112. In such examples, the targeting-determination component 140 may assign a higher confidence score to the intent for the voice-enabled device 108 whose audio signal 112 has the higher score indicating the likely level of speech presence in the audio signal 112. These are merely other illustrative examples of how the targeting-determination component 140 may calculate confidence scores for the intents for the different voice-enabled devices 108 to respond to the speech utterance 106. However, other types of data and techniques may additionally, or alternatively, be used.

Upon calculating confidences scores indicating the confidence that the determined intents are responsive to the speech utterance 106, the targeting-determination component 140 may then select the intent with the higher confidence score, and designate the corresponding voice-enabled device 108 as the target voice-enabled device 108. The targeting-determination component 140 may provide an indication of the target voice-voice-enabled device 108, as well as the determined intent, to the command processor 142.

The command processor 142 may include one or more domain speechlets which determine and generate a response for various voice-enabled devices 108 to perform. In some examples, the command processor 142 may route identified intent to the appropriate speechlets. For example, the speechlets may be specialized software, domains, and/or devices for responding based on various intents, such as a music domain (e.g., Amazon Music, Pandora, Spotify, etc.), a video domain (e.g., Amazon Video, HBO, Netflix, Hulu, etc.) household organization domain (e.g., calendars, reminders, timers, alarms, etc.), and other types of domains. As an example, an intent may correspond to a command to play a movie (movie intent), the command processor 142 may route the intent to a movie domain speechlet configured to execute a movie playing command.

Once the command processor 142 has determined or generated a command, the command processor 142 may provide data indicating the command in a response 144 to the target voice-enabled device 108. For instance, if an intent is selected for the secondary voice-enabled device 108(2) to play a movie, the command processor 142 may determine a play movie command and send a response 144 to the secondary voice-enabled device 108(2) that includes data indicating the command to, for example, stream the movie to the television 114. As another example, if the intent is selected for the secondary voice-enabled device 108(2) to being streaming a documentary about the band Bread, then the command processor 142 may generate a command included in the response 144 to cause the secondary voice-enabled device 108(2) to stream the documentary about the band Bread on the television 114.

The actions described herein are performed with respect to two voice-enabled devices 108 in the environment 102. However, any number of voice-enabled devices 108 may be used and handled in the same manner, where the rules and processes performed are scalable to account for additional voice-enabled devices 108. As described, the voice-enabled devices 108 need not detect the speech utterance 106 at all, but still be selected to perform the response 144. The orchestration component 126 may identify other voice-enabled devices 108 that did not detect the speech utterance 106 based on their device profiles being included in a grouping 138 of a device profile of the source voice-enabled device that detect the speech utterance 106. Thus, the techniques described herein may decouple speech processing of the audio signal 112 from the source voice-enabled device 108(1), and process the audio signal 112 using multiple NLU models 132 to identify an appropriate voice-enabled device 108 to respond to the speech utterance 106, regardless of which device 106 is the source voice-enabled device 108. In some examples, the NLU models 132 may be used at least partly in parallel to analyze the text data determined for the speech utterance 106 and identify intents for the different voice-enabled devices 106.

To determine the groups 138, the orchestration component 126 may perform various operations. For example, the orchestration component 126 may determine that the voice-enabled devices 108(1) and 108(2) have each transmitted audio signals 112 to the remote system 110 for processing at a same time, or within a threshold time frame (e.g., 1 second, 5 seconds, etc.). The orchestration component 126 may determine that, because the voice-enabled devices 108(1) and 108(2) have previously transmitted audio signals 112 at substantially a same time, the voice-enabled device 108(1) and 108(2) are detecting the same speech utterances 106, and are grouped together into a group 138 as being in a same physical environment 102. In further examples, the orchestration component 126 may determine that the text data determined for the two audio signals 112 represent the same speech utterance 106, and group the two voice-enabled devices 108(1) and 108(2) based on them detecting the same speech utterance 106. In even further examples, the orchestration component 126 may receive explicit input from the user 104 indicating that the two voice-enabled devices 108 are in the same environment, and store the grouping 138 of device profiles of the voice-enabled device 108(!) and voice-enabled device 108(2).

Figure 2:
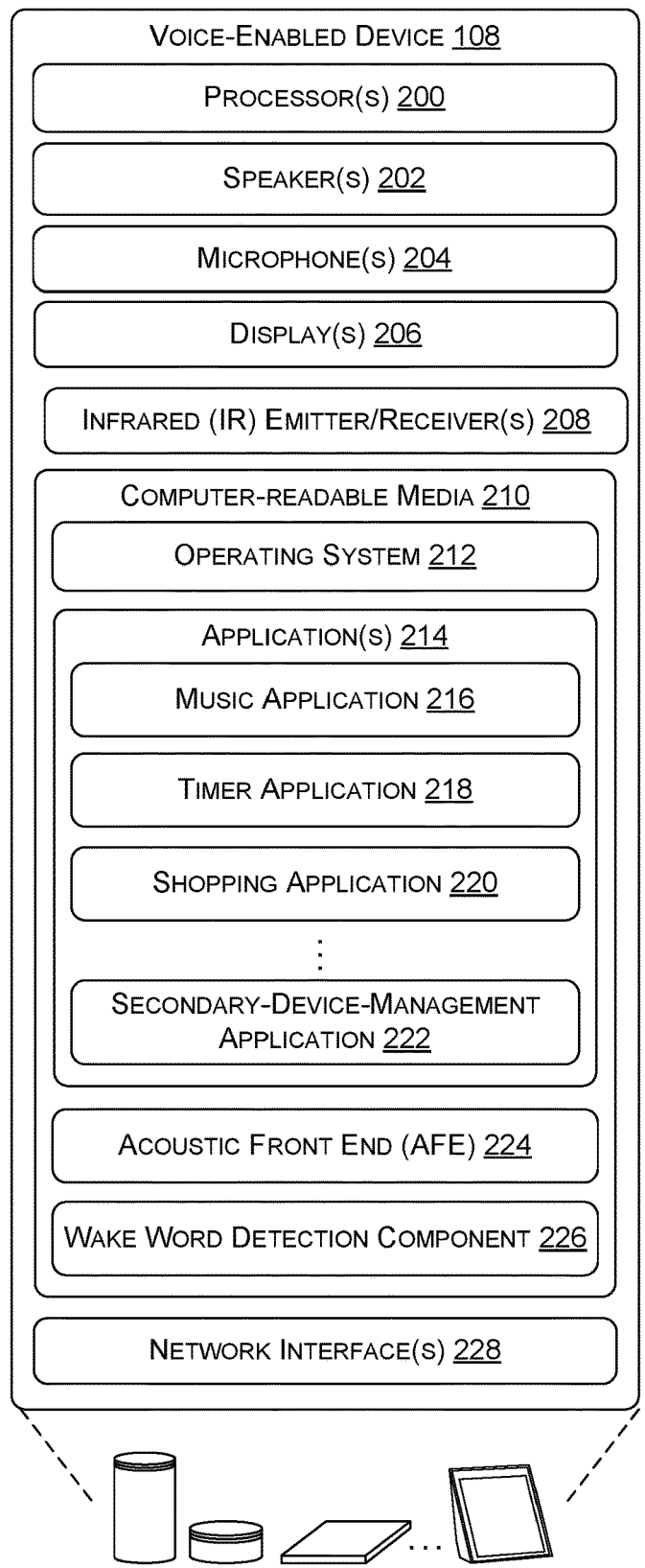
FIG. 2 illustrates a block diagram of an example architecture of a voice-enabled device that generates an audio signal, and sends the audio signal to a remote speech-processing system.

FIG. 2 illustrates block diagram of an example architecture of a voice-enabled device, such as one of the voice-enabled devices 108 of FIG. 1, that generates an audio signal 112 and metadata, and sends the audio signal 112 and metadata to a remote system 110.

The voice-enabled device 108 may include one or more processors 200, one or more speakers 202, and one or more microphones 204. The processors 200 may include a central processing unit (CPU), a graphics processing unit (GPU), a microprocessor, a digital signal processor, and so on. Although not illustrated, the voice-enabled device 108 may also include one or more input/output devices (e.g., mouse, keyboard, etc.), one or more displays 206 (e.g., touch screen, Liquid-crystal Display (LCD), Light-emitting Diode (LED) display, organic LED display, plasma display, electronic paper display, etc.), one or more sensors (e.g., accelerometer, magnetometer, etc.), one or more lights, and so on. Any number of components of the voice-enabled device 108 may be used to receive input from a user and/or to output a response.

Although the voice-enabled device 108 is illustrated as having one or more internal speakers 202, in other embodiments the voice-enabled device 108 may not include speakers 202. For example, the voice-enabled device 108 may comprise a microphone device into which a user speaks to issue commands or may comprise a device for connection to another appliance such as a television. Instead of internal speakers 202, embodiments such as this may use loudspeaker capabilities of other devices, including other voice-enabled devices that do have loudspeakers and different types of dedicated loudspeaker components. As one example, the voice-enabled device 108 may produce an audio output signal that drives an external loudspeaker. As another example, the voice-enabled device 108 may drive or control an external loudspeaker through a wireless data connection such as a Bluetooth connection. In other situations, the voice-enabled device 108 may be used in conjunction with a loudspeaker device that receives audio signals and other instructions from the remote system 110, rather than from the voice-enabled device 108. In this case, the response 148 of FIG. 1 may be provided to such as loudspeaker device rather than to the voice-enabled device 108.

The microphones 204 may include sensors (e.g., transducers) configured to receive sound. The microphones 204 may generate audio signals 112 for audio input (e.g., sound). For example, the microphones 204 may determine digital input signals for a speech utterance 106 of a user 104. In some instances, the microphones 204 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 270) to receive sound from four directions. The microphones 204 may be in a planar configuration, or positioned apart in a non-planar three-dimensional region. In some implementations, the microphones 204 may include a spatially disparate array of sensors in data communication. For example, a networked array of sensors may be included. The microphones 204 may include omni-directional microphones, directional microphones (e.g., shotgun microphones), and so on.

In some examples, the microphones 204 and the speakers 202 facilitate interactions, such as dialogue, with user 104. The microphones 204 produce audio signals representing sound from the environment 102 of the voice-enabled device 108, such speech utterances 106 by the user 104. The audio signals 112 produced by the microphones 204 may comprise directional audio signals or may be used to produce directional audio signals, where each of the directional audio signals emphasizes audio from a different radial direction relative to the microphones 204.

In some examples, the voice-enabled device 108 may further include one or more infrared (IR) emitter and receivers 208. The voice-enabled device 108 may utilize the IR emitter/receivers 208 to control secondary devices, such as the television 114 and speaker 116, and potentially other devices (e.g., entertainment systems). The IR emitter/receivers 208 may send information to secondary devices using light energy in the infrared spectrum, where the information controls operations of the secondary devices. Further, the IR emitter/receivers 208 may receive data or information from devices.

The voice-enabled device 108 may include computer-readable media 210. The computer-readable media 210 may be used to store any number of software components that are executable by the processors 200. Software components stored in the computer-readable media 210 may include an operating system 212 that is configured to manage hardware and services within and coupled to the voice-enabled device 108. Additionally, the computer-readable media 210 may store one or more applications 214, such as a music application, a timer application, a shopping application 220, a secondary-device-management application 22, and so forth. However, the voice-controlled device 104 may include any number or type of applications and is not limited to the specific examples shown here. The music application 216 may be configured to play songs or other audio files. The timer application 218 may be configured to provide the functions of a simple timing device and clock. The shopping application 220 may be configured to assist a user 104 in purchasing items from web-based merchants. The secondary-device-management application 222 may configure the voice-enabled device 108 to control secondary devices according to different technologies and communication protocols of those secondary devices.

In addition to the applications 214, the computer-readable media 210 may further store an acoustic front end (AFE) 224 for generating audio signals 112 using the microphones 112, and performing some acoustic pre-processing techniques on the audio signals 112. The AFE 224 may include functionality for processing microphone audio signals generated by the microphones 204 and/or output audio signals provided to the speakers 202. As an example, the AFE 224 may include an acoustic echo cancellation or suppression component for reducing acoustic echo generated by acoustic coupling between the microphones 204 and the speaker 202. The AFE 224 may also include a noise reduction component for reducing noise in received audio signals 112, such as elements of microphone audio signals other than user speech.

The AFE 224 may include one or more audio beamformers or beamforming components configured to generate directional audio signals that are focused in different directions. More specifically, the beamforming components may be responsive to audio signals from spatially separated microphone elements of the microphones 204 to produce directional audio signals that emphasize sounds originating from different areas of the environment of the voice-enabled device 108 or from different directions relative to the voice-enabled device 108. The beamforming components may in some cases produce audio signal metric values (e.g., SNR values, VAD values, etc.) that may be used to determine appropriate intents and target voce-enable devices 108. For example, the beamforming components may indicate a signal strength of voice activity level corresponding to each directional audio signal.

The AFE 224 may also include a voice activity detection component configured to monitor levels of voice presence in the directional audio signals produced by the beamforming component. Levels of voice presence may be used as am audio signal metric value for purposes of selection an intent and target voice-enabled device from multiple voice-enabled computing devices 108. In some examples, the voice activity may include an indication of the signal strength of the speech utterance 106 and an indication of ambient noise in the environment 102. For instance, the voice activity may be a ratio of the signal strength of the speech utterance 106 in an audio signal 112 with the ambient noise in the audio signal 112.

The AFE 224 of the voice-enabled device 108 may also include a sound source localization (SSL) component that may be used to determine the distance of the user 104 from the voice-enabled device 108. The SSL component is configured to analyze differences in arrival times of received sound at the respective microphones of the microphones 204 in order to determine the position from which the received sound originated. For example, the SSL component may use time-difference-of-arrival (TDOA) techniques to determine the position or direction of a sound source. The determined position may be used as an audio signal metric value for purpose of performing arbitration as described herein.

Executable components stored in the computer-readable media 210 and executed by the processors 200 may include a wake word detection component 226 that monitors one or more of the directional audio signals to detect user utterances of the system of the trigger expression. As described above, wakeword detection may be implemented using keyword spotting technology, as an example.

The voice-enabled device 108 also has various hardware components, not shown, such as communication components, power components, I/O components, signal processing components indicators, control buttons, amplifiers, etc. For instance, rather than receiving a "wake-word" to wake up, a voice-enabled device 108 instead begin listening in response to a user 104 pressing a button on the device 108.

The voice-enabled device 108 may have one or more network interfaces 228 such as a wireless or Wi-Fi network communications interface, an Ethernet communications interface, a cellular network communications interface, a Bluetooth communications interface, etc., for communications with the remote system 110 over various types of networks 118, including wide-area network, local-area networks, private networks, public networks etc. In the case of a wireless communications interfaces, such interfaces may include radio transceivers and associated control circuits and logic for implementing appropriate communication protocols.

While various processing techniques and audio signal metric values are discussed herein, any other type of audio signal metric value may be determined using the components of the voice-enabled device 108.

Figure 3:
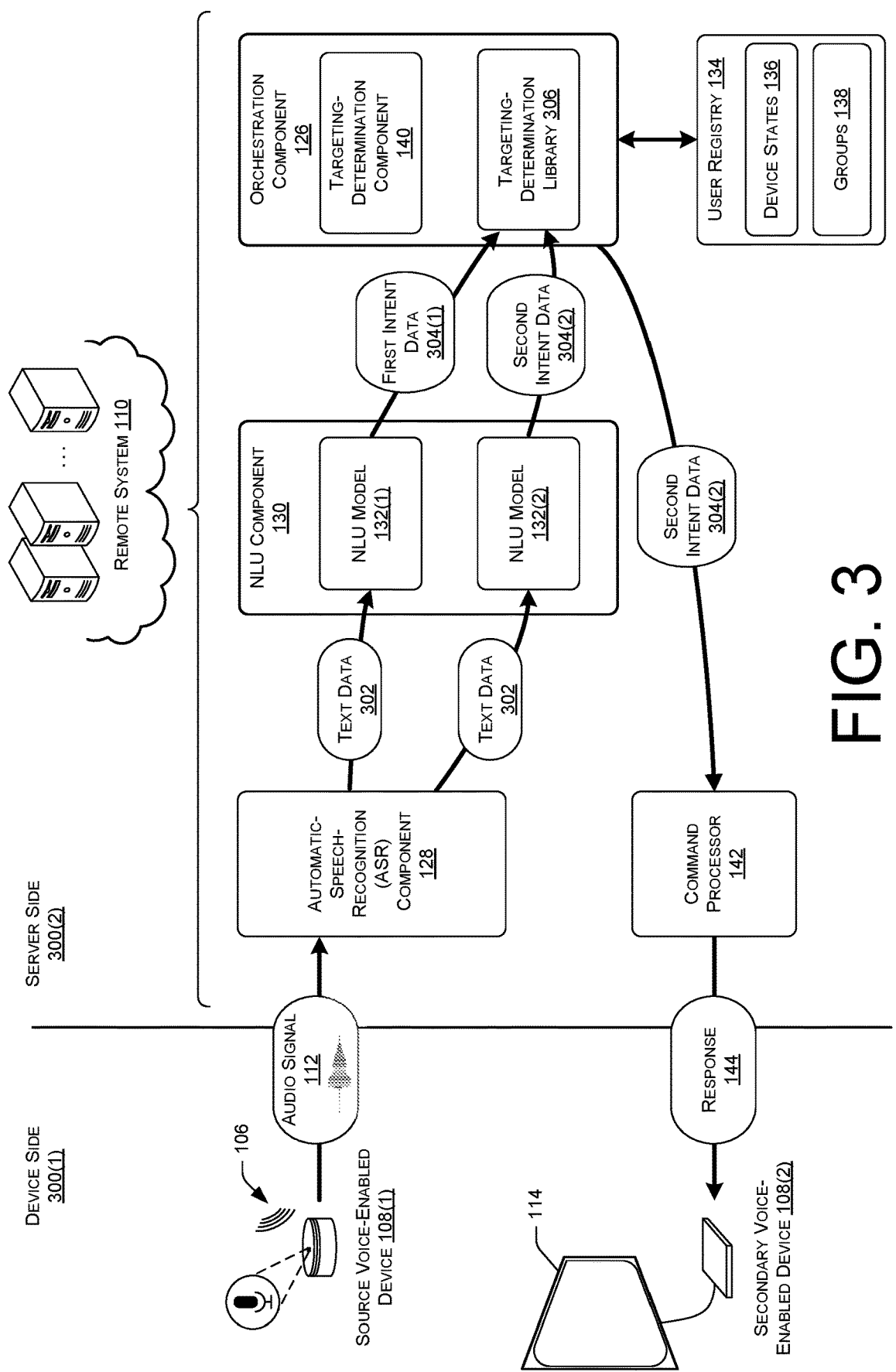
FIG. 3 illustrates example components of the remote system of FIG. 1 that performs an example of bifurcated processing on an audio signal representing a speech utterance of a user to determine a voice-enabled device to respond to the speech utterance.

FIG. 3 illustrates example components of the remote system 110 of FIG. 1 that performs an example of bifurcated processing on an audio signal 112 representing a speech utterance 106 of a user 104 to determine a voice-enabled device 108 to respond to the speech utterance 106. As illustrated, FIG. 3 is split into a device-side 300(1), corresponding to the environment 102, and a server-side 300(2), corresponding to the remote system 110. The device side 300(1) may include various user devices, such as a source voice-enabled device 108(1), a secondary voice-enabled device 108(2), and a secondary device 114 of a television. In various embodiments, other user devices may be substituted for the illustrated devices, or added to the device side 300(1).

As shown, the source voice-enabled device 108(1) may detect a speech utterance 106, and user a microphone 204 to generate an audio signal 112 representing the speech utterance 106. The source voice-enabled device 108(1) may transmit the audio signal 112 from the device side 300(1) to the remote system 110 on the server-side 300(2). The ASR component 128 of the remote system 110 may convert the audio signal into text data 302 using ASR techniques, where the text data 302 corresponds to the speech utterance 106. The orchestration component 126 may determine, based on a device profile of the source voice-enabled device 108(1), that a device profile of the secondary voice-enabled device 108(2) is in a stored grouping 138 with the source voice-enabled device 108(1). In such examples, the orchestration component 126 may provide an indication of the device profiles of the voice-enabled devices 108(1) and 108(2) to the NLU component 130.

The NLU component may bifurcate analysis of the text data 302 using an NLU model 132(1) that is trained, or biased, to identify intents for the device profile of the source voice-enabled device 108(1), and an NLU model 132(2) that is trained, or biased, to identify intents for the device profile of the secondary voice-enabled device 108(2). The NLU component 130 may determine first intent data 304(1) by analyzing the text data 302 using the NLU model 132(1), and further determine second intent data 304(2) by analyzing the text data 302 using the NLU model 132(2). In some examples, the first intent data 304(1) and the second intent data 304(2) may comprise different intent data. The orchestration component 126 may provide the first intent data 304(1) and second intent data 304(2) to a targeting-determination library 306. The targeting-determination library 206 may include various rules that, when executed by the targeting-determination component 140, determines whether the first intent data 304(1) or the second intent data 304(2) should be selected for responding to the speech utterance 106. For instance, the targeting-determination library 306 may calculate confidence scores/values for the first intent data 304(1) and the second intent data 304(2). In some examples, the targeting-determination component 140 may query the user registry 134 to identify device states 136 for the source voice-enabled device 108(1) and the secondary voice-enabled device 108(2) for use in calculating the confidence scores. The targeting-determination component 140 may select the intent data with the highest confidence score. In the illustrated example, the targeting-determination component 140 may select the second intent data 304(2) because the second intent data 304(2) was determined as having the highest confidence value as being responsive to, or appropriate for, responding to the speech utterance 106.

The command processor 142 may receive the second intent data 304(2) and generate a response for the secondary voice-enabled device 108(2) to perform. Once the command processor 142 has determined or generated a command, the command processor 142 may provide data indicating the command in a response 144 to the secondary voice-enabled device 108(2).

Figure 4A:
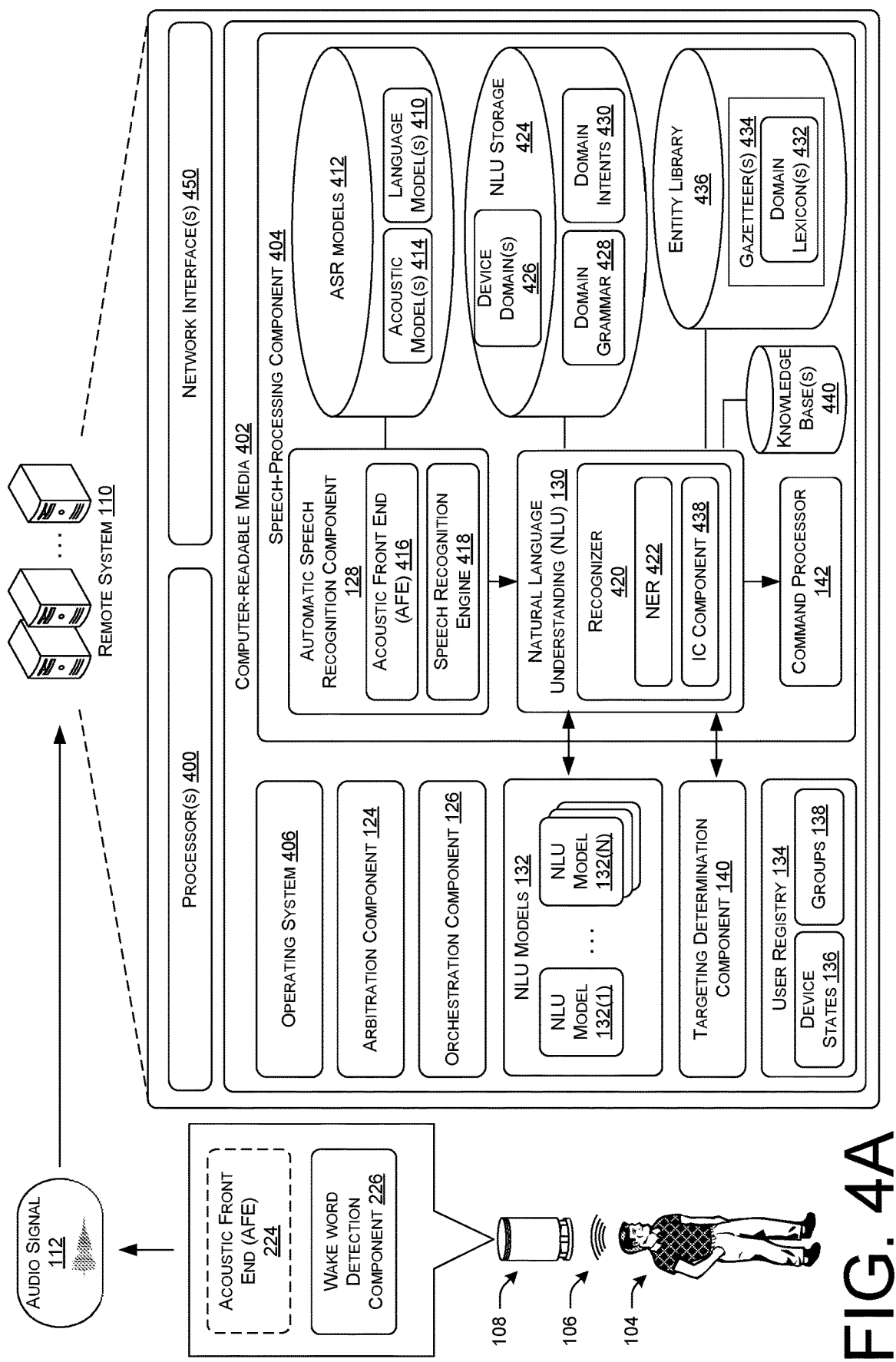
FIG. 4A illustrates a block diagram of an example architecture of a remote system which receives an audio signal from a voice-enabled device, and performs dual processing on the audio signal to determine which of multiple voice-enabled devices is to respond to a speech utterance of a user represented in the audio signal.

FIG. 4A illustrates a block diagram of an example architecture of a remote system 110 which receives an audio signal 112 from a voice-enabled device 108, and performs processing techniques to determine which of the voice-enabled devices 108 is to respond to a speech utterance 106 of a user 104 represented in the audio signal 112.

FIG. 4A includes a conceptual diagram of how a speech utterance 106 can be processed, allowing a system to capture and execute commands spoken by a user 104, such as spoken commands that may follow a wakeword. The various components illustrated may be located on a same or different physical devices. Communication between various components illustrated in FIG. 4A may occur directly or across a network 118. An audio capture component, such as a microphone 204 of voice-enabled device 108, captures audio corresponding to a speech utterance 106. The voice-enabled device 108, using a wakeword detection component 226, then processes the speech utterance 106, or audio data corresponding to the speech utterance 106, to determine if a keyword (such as a wakeword) is detected in the speech utterance 106. Following detection of a wakeword, the voice-enabled device 108 sends an audio signal 112 corresponding to the speech utterance 106, to a computing device of the remote system 110 that includes the ASR component 128. The audio signal 112 may be output from an acoustic front end (AFE) 224 located on the voice-enabled device 108 prior to transmission. Or, the audio signal 112 may be in a different form for processing by a remote AFE 416, such as the AFE 416 located with the ASR component 128.

In various examples, the remote system 110 may include one or more processors 400 to power components, devices, and actions of the remote system 110, and one or more network interfaces 450 such as a wireless or Wi-Fi network communications interface, an Ethernet communications interface, a cellular network communications interface, a Bluetooth communications interface, etc., for communications by the remote system 110 over various types of networks 118, including wide-area network, local-area networks, private networks, public networks etc. In the case of a wireless communications interfaces, such interfaces may include radio transceivers and associated control circuits and logic for implementing appropriate communication protocols.

The remote system 110 may further include computer-readable media 402 which stores various components, components, or other executable software to perform various arbitration actions to determine which voice-enabled device is to respond to a command in the speech utterance 106. The computer-readable media may store an operating system 406 that is configured to manage hardware and services within and coupled to the remote system 110.

The computer-readable media 402 may further store a dialog management component (not shown) that is responsible for conducting speech dialogs with the user 104 in response to meanings or intents of user speech determined by the NLU component 130. The dialog management component may include domain logic that is used to analyze the meaning of user speech and to determine how to respond to the user speech. The dialog management component may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user utterances.

The computer-readable media 402 may further include the arbitration component 124, the targeting-determination component 140, and the user registry 134 including the device indications 138. The arbitration component 124 may perform various functions or processes for determining an audio signal 112 to use for ASR processing based on audio signal metric values for voice-enabled devices 108 that generated audio signals 112 corresponding to a speech utterance 106. The targeting-determination component 140 may perform various operations for determining which voice-enabled devices 108 are to respond to a command in the speech utterance 106. For instance, the targeting-determination component 140 may determine, using the NLU models 132 to analyze the text data, and the user registry 134 to identify device states 136, all of the voice-enabled devices 108 and/or secondary devices 116/116 associated with a user and/or household account. The targeting-determination component 140 may use the intents determined using the different NLU models 132 based on text data representing the speech utterance 106 determined by the NLU component 130, and the devices states 136 stored in the user registry 134 to determine which of the devices 108 should perform the command indicated in the speech utterance 106.

The remote system 110 may further include various components for processing a speech utterance 106, such as automatic speech recognition component 128 and natural language understanding component 130. The various components illustrated may be located on a same or different physical devices.

In some examples, audio data (e.g., audio signals 112) may be received by the remote system 110 for speech processing for interpretation of the included speech utterance 106 (either for purposes of enabling voice-communications and/or for purposes of executing a command in the speech). The audio data may include data corresponding to the wakeword, or the portion of the audio data corresponding to the wakeword may be removed by the voice-enabled device 108 prior to sending. Upon receipt by the remote system 110, the ASR component 128 may convert the audio data into text. The ASR component 128 transcribes audio data into text data representing the words of the speech contained in the audio data. The text data may then be used by other components for various purposes, such as arbitration, executing system commands, inputting data, etc. A speech utterance 106 in the audio data is input to a processor configured to perform ASR which then interprets the utterance based on the similarity between the utterance and pre-established ASR language models stored in an ASR model knowledge base (ASR Models Storage 412). For example, the ASR process may compare the input audio data with models for sounds (e.g., subword units or phonemes) and sequences of sounds to identify words that match the sequence of sounds spoken in the utterance of the audio data.

The different ways a speech utterance 106 may be interpreted (i.e., the different hypotheses) may each be assigned an ASR probability or an ASR confidence score representing the likelihood that a particular set of words matches those spoken in the utterance. The ASR confidence score may be based on a number of factors including, for example, the similarity of the sound in the utterance to models for language sounds (e.g., an acoustic model 414 stored in an ASR Models Storage 412), and the likelihood that a particular word which matches the sounds would be included in the sentence at the specific location (e.g., using a language or grammar model). Thus, each potential textual interpretation of the spoken utterance (hypothesis) is associated with an ASR confidence score. Based on the considered factors and the assigned ASR confidence score, the ASR component 128 outputs the most likely text recognized in the audio data. The ASR component 128 may also output multiple ASR hypotheses in the form of a lattice or an N-best list with each hypothesis corresponding to an ASR confidence score or other score (such as probability scores, etc.).

The device or devices performing the ASR processing may include an acoustic front end (AFE) 416 and a speech recognition engine 418. The acoustic front end (AFE) 416 transforms the audio data from the microphone into data for processing by the speech recognition engine 418. The speech recognition engine 418 compares the speech recognition data with acoustic models 414, language models 410, and other data models and information for recognizing the speech conveyed in the audio data. The AFE 416 may reduce noise in the audio data and divide the digitized audio data into frames representing time intervals for which the AFE 416 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 416 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 418 may process the output from the AFE 416 with reference to information stored in speech/model storage (412). Alternatively, post front-end processed data (such as feature vectors) may be received by the device executing ASR processing from another source besides the internal AFE 416. For example, the voice-enabled device 108 may process audio data into feature vectors (for example using an on-device AFE 416) and transmit that information to a server across a network for ASR processing. Feature vectors may arrive at the remote system 110 encoded, in which case they may be decoded prior to processing by the processor executing the speech recognition engine 418.

The speech recognition engine 418 attempts to match received feature vectors to language phonemes and words as known in the stored acoustic models 414 and language models 410. The speech recognition engine 418 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 418 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 418 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 110, for natural language understanding (NLU) processing, such as conversion of the text into commands for execution, either by the user device, by the remote system 110, or by another device (such as a server running a specific application like a search engine, etc.).

The NLU component 130 (e.g., server) may include various components, including potentially dedicated processor(s), memory, storage, etc. As shown in FIG. 4A, the NLU component 130 may include a recognizer 420 that includes a named entity recognition (NER) component 422 which is used to identify portions of query text that correspond to a named entity that may be recognizable by the system. A downstream process called named entity resolution links a text portion to a specific entity known to the system. To perform named entity resolution, the system may utilize gazetteer information 434 stored in entity library storage 436. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU component 130 takes textual input (such as the textual input determined by the ASR component 128) and attempts to make a semantic interpretation of the text. That is, the NLU component 130 determines the meaning behind the text based on the individual words and then implements that meaning. NLU component 130 interprets a text string to derive an intent or a desired action from the user as well as the pertinent pieces of information in the text that allow a device (e.g., voice-enabled device 108) to complete that action. For example, if a spoken utterance is processed using ASR component 128 and outputs the text "turn off the alarm" the NLU component 130 may determine that the user 104 intended that the voice-enabled device 108(2) be instructed to turn off an alarm sound being output. As another example, if the spoken utterance is processed using ASR component 128 and outputs the text "hang up the phone" the NLU component 130 may determine that the user 104 intended that the voice-enabled device 108(1) be instructed to hang up a phone through which a phone call is being performed.

The NLU component 130 may process several textual inputs related to the same utterance. For example, if the ASR component 128 outputs N text segments (as part of an N-best list), the NLU component 130 may process all N outputs to obtain NLU results.

To correctly perform NLU processing of speech input, the NLU component 130 may be configured to determine a "domain" of the utterance so as to determine and narrow down which services offered by the endpoint device (e.g., remote system 110 or the voice-enabled device 108) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 422 receives a query in the form of ASR results and attempts to identify relevant grammars and lexical information that may be used to construe meaning. To do so, the NLU component 130 may begin by identifying potential domains that may relate to the received query. The NLU storage 424 includes a database of devices domains 426 which identify domains associated with specific devices. For example, the voice-enabled device 108 may be associated with domains for music, telephony, calendaring, contact lists, and device-specific communications, but not video. In addition, the device domains 426 may include database entries about specific services on a specific device, either indexed by Device ID, User ID, or Household ID, or some other indicator.

The NLU models 132 may each be associated with a different device domain 426. For instance, each of the NLU models 132 may be associated with a device domain 426 which has been trained or biased to determine intents based on device capabilities of the voice-enabled device 108 associated with the respective NLU model 132. As an example, a device domain 426 may be associated with an NLU model 132 that has been trained or biased to determine intents based on the device capabilities of voice-enabled device 108(1), which includes a shopping intent domain, music intent domain, etc. Further, a device domain 426 may be associated with a different device domain 426 which may be associated with a different NLU model 132 that has been trained or biased to determine intents based on the device capabilities of the voice-enabled device 108(2), such as a video domain, a television domain, etc.

In NLU processing, a domain may represent a discrete set of activities having a common theme, such as "shopping," "music," "calendaring," etc. As such, each domain may be associated with a particular recognizer 420, language model and/or grammar databases 428, a particular set of domain intents/actions 430, and a particular personalized domain lexicon 432. Each gazetteer 434 may include domain-indexed lexical information associated with a particular user and/or device. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) component 438 parses the query to determine an intent or intents for each identified domain, where the intent corresponds to the action to be performed that is responsive to the query. Each domain is associated with a database (e.g., domain intents 430) of words linked to intents. For example, a music domain intent database 430 may link words and phrases such as "quiet," "volume off," and "mute" to a "mute" intent. A voice-message domain intent database, meanwhile, may link words and phrases such as "send a message," "send a voice message," "send the following," or the like. The IC component 438 identifies potential intents for each identified domain by comparing words in the query to the words and phrases in the domain intents database 430. In some instances, the determination of an intent by the IC component 438 is performed using a set of rules or templates that are processed against the incoming text to identify a matching intent.

In order to generate a particular interpreted response, the NER 422 applies the grammar models and lexical information associated with the respective domain to actually recognize a mention one or more entities in the text of the query. In this manner, the NER component 422 identifies "slots" (i.e., particular words in query text) that may be needed for later command processing. Depending on the complexity of the NER component 422, it may also label each slot with a type of varying levels of specificity (such as noun, place, city, artist name, song name, or the like). Each grammar model 428 includes the names of entities (i.e., nouns) commonly found in speech about the particular domain (i.e., generic terms), whereas the lexical information 432 from the gazetteer 434 is personalized to the user(s) and/or the device. For instance, a grammar model associated with the shopping domain may include a database of words commonly used when people discuss shopping.

The intents identified by the IC component 438 are linked to domain-specific grammar frameworks (included in 430) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (428) framework or frameworks may correspond to sentence structures such as "Send a message to {contact}," "Send a voice message to {contact}," "Send the following to {contact}," etc.

For example, the NER component 422 may parse the query to identify words as subject, object, verb, preposition, etc., based on grammar rules and/or models, prior to recognizing named entities. The identified verb may be used by the IC component 438 to identify intent, which is then used by the NER component 422 to identify frameworks. A framework for the intent of "send a message," meanwhile, may specify a list of slots/fields applicable to play the identified "contact" and any object modifier (e.g., specifying a device of the recipient) or the like. The NER component 422 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 422 may search the database of generic words associated with the domain (in the knowledge base 440). So, for instance, if the query was "send message to Joe," after failing to determine a last name for "Joe," the NER component 422 may search the domain vocabulary for the word "Joe." In the alternative, generic words may be checked before the gazetteer information, or both may be tried, potentially producing two different results.

In some examples, the IC component 438 may identify multiple possible intents for each device domain(s) 426 model (e.g., NLU models 132). As part of the process for determining intents, the IC component 438 may further determine confidence values for the different intents determines for the text data. The IC component 438 may determine, based on for example how well the text data matches to frameworks including the list of slots/fields in the domain-specific grammar frameworks included in the domain intents 430. For instance, the IC component 438 may determine how well the words in the text data received from ASR, such as a subject, verb, preposition, etc., match with corresponding frameworks of slots/fields for the determined intents. In addition to matching words between the text data received from the ASR component 128 and the words included in the slots/fields of the intent frameworks in the domain intents 430, the IC component 438 may compare the proximity, order, etc., of the words in the text data with the framework of slots/fields. Based on how well the text data matches or aligns with the frameworks of slots/fields for the multiple intents, different intent confidence values may be determined. For example, if the words, order of the words, proximity of the words, etc., match well with a framework of slots/fields for an intent, the intent confidence score for the corresponding intent may be a higher intent confidence score, and vice-versa. The intent confidence scores for intents may be utilized for determining which of the multiple intents determined using the device-specific NLU models 132 are more responsive to the speech utterance 106, and should be used to select a device 108.

The output data from the NLU component 130 (which may include tagged text, commands, etc.) may then be sent to the command processor 142. The destination command processor 142 may be determined based on the NLU output. For example, if the NLU output includes a command to send a message, the destination command processor 142 may be a message sending application, such as one located on the user device or in a message sending appliance, configured to execute a message sending command. If the NLU output includes a search request, the destination command processor 142 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 130 during runtime operations where NLU operations are performed on text (such as text output from an ASR component 128). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 420. Each recognizer may include various NLU components such as an NER component 422, IC component 438 and other components such as an entity resolver, or other components.

As noted above, multiple devices may be employed in a single remote system 110. In such a multi-device system, each of the devices may include different components for performing different aspects of the speech processing. The multiple devices may include overlapping components. The components of the voice-enabled device 108 and the remote system 110, as illustrated herein are exemplary, and may be located in a stand-alone device or may be included, in whole or in part, as a component of a larger device or system, may be distributed across a network or multiple devices connected by a network, etc.

Figure 4B:
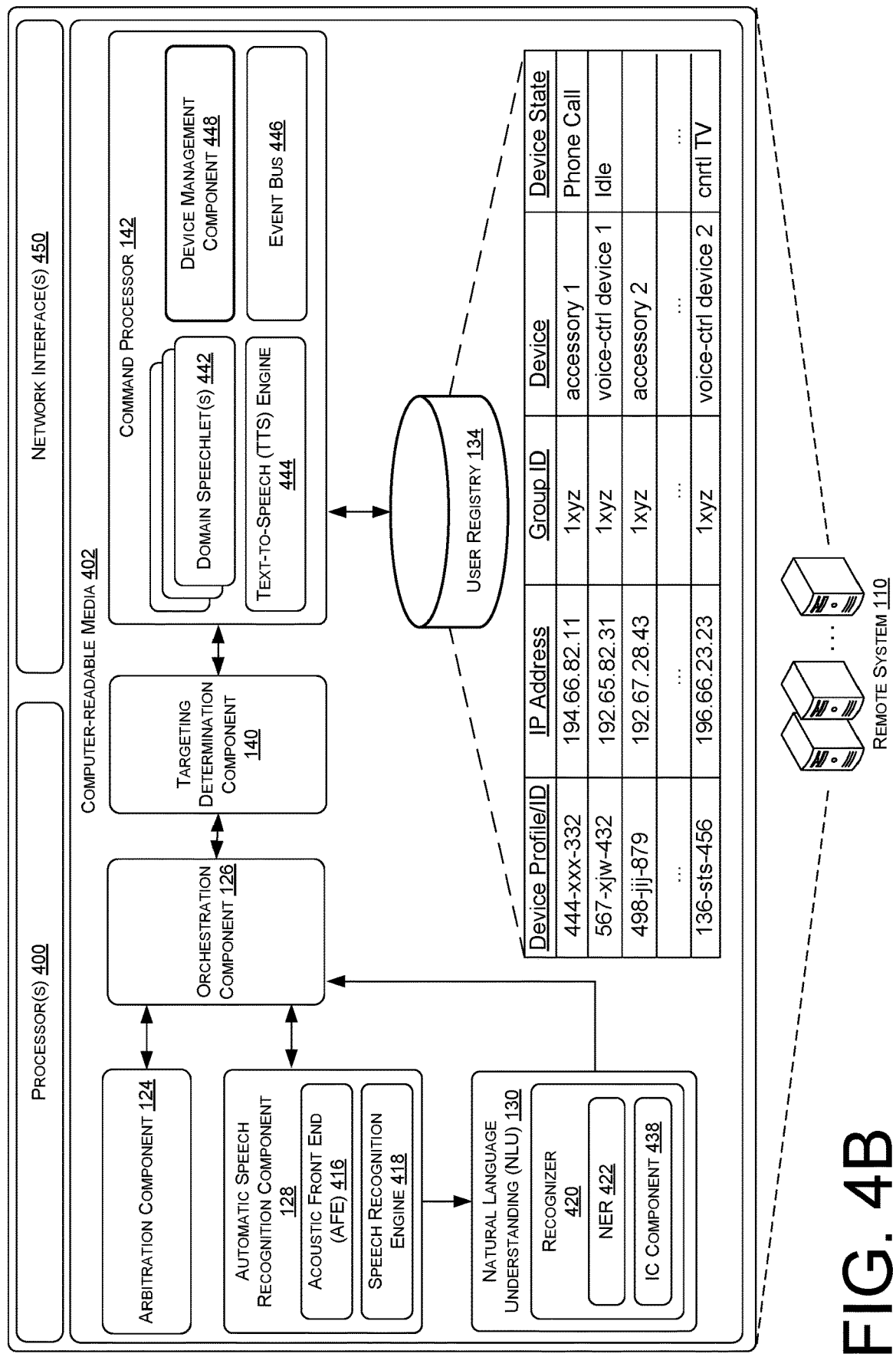
FIG. 4B illustrates a block diagram of an example architecture of a remote system including components configured to make a decision as to which voice-enabled device is to respond to a speech utterance of a user.

FIG. 4B illustrates a block diagram of an example architecture of the remote system 110 including the command processor 142 configured to generate a command that the selected voice-enabled device 108 uses to respond to the speech utterance 106. As illustrated in FIG. 4B, the remote system 110, including the orchestration component 124, the ASR component 128, and the NLU component 130, may be coupled to the targeting-determination component 140. The target determination component 140 may have determined an intent and voice-enabled device to respond to the speech utterance 106. Thus, the targeting-determination component 140 may perform techniques to determine the target device (e.g., a device to perform the requested operation), and provide various data to the command processor 142. For instance, the targeting-determination component 140 may provide the command processor 142 with various device identifiers of the voice-enabled devices 108, the determined target device, the determined intent and/or command, etc.

The command processor 142 and/or NLU component 130 may determine a domain based on the intent and, based on this determination, route the request corresponding to the audio data to the appropriate domain speechlet, such as the illustrated domain speechlets 442. The domain speechlet 442 may comprise any type of device or group of devices (e.g., hardware device, virtual devices or partitions, server, etc.), and may receive the text data and/or an intent associated with the audio signals 112 and determines how to respond to the request. For instance, the intent for a command "please hang up my phone call" may be routed to a smart home domain speechlet 442 which controls devices connected to the voice-enabled devices 108, such as a phone through which a phone call is being conducted. The smart home domain speechlet 442 may determine a command to generate based on the intent of the user 104 to hang up a phone call. Additionally, the smart home domain speechlet 442 may determine additional content, such as audio data, to be output by one of the voice-enabled devices 108(1) or 108(2), such as "we have hung up your phone call."

Various types of domain speechlets 442 may be used to determine which devices 108 to use to respond to a speech utterance 106, as well as the appropriate response 148 and potential additional content (e.g., audio data). For example, the domain speechlets 442 may include a third party skills domain speechlet 442 which may handle intents associated with gaming, productivity, etc., a music domain speechlet 442 which may handle intents associated with music play requests (e.g., Amazon Music, Pandora, Spotify, iHeart, etc.), a video domain speechlet 442 which may handle intents associated with video play requests (e.g., Amazon Video, HBO, Netflix, Hulu, etc.), a household organization domain speechlet 442 which may handle intents associated with household activities (e.g., calendars, reminders, timers, etc.), a smart home domain speechlet 442 which may handle intents associated with controlling smart devices (e.g., controlling lights, door locks, home monitoring, etc.), an automotive domain speechlet 442, a shopping domain speechlet 442 which may handle shopping requests (e.g., making a shopping list, ordering items online, etc.), and/or a weather domain speechlet 442 which may handle requests for weather forecasts (e.g., providing a URL to a weather website, providing weather related images and/or videos, etc.).

After the domain speechlet 442 generates the appropriate command based on the intent of the user 104, and/or provides additional content, such as audio data, to be output by one of the voice-enabled devices 108 (e.g., "we have hung up your phone call"), the domain speechlet 442 may provide this information back to the remote system 110, which in turns provides some or all of this information to a text-to-speech (TTS) engine 444. The TTS engine 444 then generates an actual audio file for outputting the second audio data determined by the domain speechlet 442 (e.g., "we have hung up your phone call", or "we have turned off your alarm . . . "). After generating the file (or "audio data"), the TTS engine 444 may provide this data back to the remote system 110.

The remote system 110 may then publish (i.e., write) some or all of this information to an event bus 446. That is, the remote system 110 may provide information regarding the initial request (e.g., the speech, the text, the domain/intent, etc.), the response to be provided to the voice-enabled device 108 (e.g., the command to hang up a phone call, the command to turn off an alarm, etc.), or any other information pertinent to the interaction between the voice-enabled device 108(1) and the remote system 110 to the event bus 446.

Within the remote system 110, one or more components or services may subscribe to the event bus 446 so as to receive information regarding interactions between user devices and the remote system 110. In the illustrated example, for instance, the device management component 448 may subscribe to the event bus 446 and, thus, may monitor information regarding these interactions. In some examples, monitoring information in the event bus 446 may comprise communications between various components of the remote system 110. For example, the targeting-determination component 140 may monitor the event bus 446 to identify device-state data for voice-enabled devices 108. In some examples, the event bus 446 may "push" or send indications of events and/or device-state data to the targeting component. Additionally, or alternatively, the event bus 446 may be "pulled" where the targeting-determination component 140 sends requests to the event bus 446 to provide an indication of device-state data for a voice-enabled device 108. The event bus 446 may store indications of the device states for the devices 108, such as in a database (e.g., user registry 134), and using the stored indications of the device states, send the device-state data for voice-enabled devices 108 to the targeting component. Thus, to identify device-state data for a device 108 and/or 112, the targeting-determination component 140 may send a request to the event bus 446 (e.g., event component) to provide an indication of the device-state data 136 associated with a device 108 and/or 112, and receive, from the event bus 446, the device-state data 136 that was requested.

The device management component 448 functions to monitor information published to the event bus 446 and identify events that may trigger action. For instance, the device management component 448 may identify (e.g., via filtering) those events that: (i) come from voice-enabled devices 108 that are associated with secondary device(s) 112 (e.g., have secondary devices 112 in their environments such as televisions, personal computing devices, etc.), and (ii) are associated with supplemental content (e.g., image data, video data, etc.). The dev device management component 448 may reference the user registry 134 to determine which voice-enabled devices 108 are associated with secondary devices 114/116, as well as determine device types, states, and other capabilities of these secondary devices 114/116. For instance, the device management component 448 may determine, from the information published to the event bus 446, an identifier associated with the voice-enabled device 108 making the corresponding request or the voice-enabled device 108 selected to respond to the speech utterance 106. The device management component 448 may use this identifier to identify, from the user registry 134, a user account associated with the voice-enabled device 108. The device management component 448 may also determine whether any secondary devices 114/116 have been registered with the identified user account, as well as capabilities of any such secondary devices 114/116, such as how the secondary devices 114/116 are configured to communicate (e.g., via WiFi, short-range wireless connections, etc.), the type of content the devices 114/116 are able to output (e.g., audio, video, still images, flashing lights, etc.), and the like.

The device management component 448 may determine whether a particular event identified is associated with supplemental content. That is, the device management component 448 may write, to a datastore, indications of which types of events and/or which primary content or responses are associated with supplemental content. In some instances, the remote system 110 may provide access to third-party developers to allow the developers to register supplemental content for output on secondary devices for particular events and/or primary content. For example, if a voice-enabled device 108 is to output that the weather will include thunder and lightning, the device management component 448 may store an indication of supplemental content such as thunder sounds, pictures/animations of lightning and the like. In another example, if a voice-enabled device 108 is outputting information about a particular fact (e.g., "a blue whale is the largest mammal on earth . . . "), then a secondary device 112, such as television, may be configured to provide supplemental content such as a video or picture of a blue whale. In these and other examples, the device management component 448 may store an association between the primary response or content (e.g., outputting of information regarding the world's largest mammal) and corresponding supplemental content (e.g., the audio data, image data, or the like). In some instances, the device management component 448 can also indicate which types of secondary devices are to output which supplemental content. For instance, in the instant example, the device management component 448 may store an indication that secondary devices 114/116 of a class type "tablet" are to output a picture of a blue whale. In these and other instances, meanwhile, the device management component 448 may store the supplemental content in association with secondary-device capabilities (e.g., devices with speakers output the audio commentary, devices with screens output the image, etc.).

Finally, the device management component 448 may determine how to transmit response and/or supplement content (and/or information acquiring the content) to the voice-enabled devices 108 and/or the secondary devices 112. To make this determination, the device management component 448 may determine a device type of the voice-enabled devices 108 and/or secondary devices 114/116, capabilities of the device(s), or the like, potentially as stored in the user registry 134. In some instances, the device management component 448 may determine that a particular device is able to communicate directly with the remote system 110 (e.g., over WiFi) and, thus, the device management component 448 may provide the response and/or content directly over a network 118 to the secondary device 114/116 (potentially via the remote system 110). In another example, the device management component 448 may determine that a particular secondary device 112 is unable to communicate directly with the remote system 110, but instead is configured to communicate with a voice-enabled device 108 in its environment over short-range wireless networks. As such, the device management component 448 may provide the supplement content (or information) to the remote system 110, which in turn may send this to the voice-enabled device 108, which may send the information over a short-range network to the secondary device 114/116.

The computer-readable media 402 may further include the user registry 134 that includes data regarding user profiles as described herein. The user registry 134 may be located part of, or proximate to, the remote system 110, or may otherwise be in communication with various components, for example over the network 118. The user registry 134 may include a variety of information related to individual users, accounts, etc. that interact with the voice-enabled devices 108, and the remote system 110. For illustration, the user registry 134 may include data regarding the devices associated with particular individual user profiles. Such data may include user or device profile or identifier (ID) and internet protocol (IP) address information for different devices as well as names by which the devices may be referred to by a user. Further qualifiers describing the devices may also be listed along with a description of the type of object of the device. Further, the user registry 134 may store indications of associations between various voice-enabled devices 108 and/or secondary device 114/116 (e.g., group IDs), such as virtual clusters of devices. The user registry 134 may represent clusters of devices 108 and/or 114/116 as single devices that can receive commands and disperse the commands to each device 108 and/or 114/116 in the cluster. In some examples, the virtual cluster of devices may be represented as a single device which is determined as being capable, or not capable (e.g., offline), of performing a command in a speech utterance. A virtual cluster of devices may generally correspond to a stored grouping of devices, or a stored association between a group of devices.

In some examples, the device state for devices associated with a user account may indicate a current state of the device, such as voice-enabled devices 108(1) and 108(2). In this way, the command processor 142 and/or the domain speechlets 442 may determine, based on the stored device states in the user registry 134, a current device state of the voice-enabled devices 108. Rather than receiving device states for the voice-enabled devices 108, in metadata 116, the devices states may already have been determined or received and stored in the user registry 134. Further, the user registry 134 may provide indications of various permission levels depending on the user. As an example, the remote system 110 may perform speaker recognition on the audio signals 112 to determine an identity of the speaker. If the speaker is a child for instance, the child profile may have permission restrictions where they are unable to hang up a phone call of a parent, for example. Conversely, a parent profile may be able to hang up a phone call involving a child profile, or change channel on a television when a child profile is also detected as watching the television.

In some examples, to determine the device state, the event bus 446 may publish different events which indicate device states to various entities or components that subscribe to the event bus 446. For instance, if an event of "set an alarm" occurs for a voice-enabled device 108, the event bus 446 may publish the indication of this event, and thus the device state of an alarm is set for the voice-enabled device 108. Thus, various components, such as the targeting-determination component 140, may be provided with indications of the various device states via the event bus 446. The event bus 446 may further store and/or update device states for the voice-enabled devices 108 in the user registry 134. The components of the remote system 110 may query the user registry 134 to determine device states.

A particular user profile may include a variety of data that may be used by the system 110. For example, a user profile may include information about what voice-enabled device 108 are associated with the user 104. The user profile may further indicate an IP address for each of the devices associated with the user 104, user IDs for each of the devices, indicates of the types of devices, and current device states for the devices.

As used herein, a processor, such as processor(s) 120, 200, and/or 400, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 120, 200, and/or 400 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 120, 200, and/or 400 may possess its own local memory, which also may store program components, program data, and/or one or more operating systems.

As described herein, computer-readable media 122, 210, and/or 402 may include volatile and nonvolatile memory, removable and non-removable media implemented in any method or technology for storage of information, such as computer-readable instructions, data structures, program component, or other data. Such computer-readable media 122, 210, and/or 402 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 122, 200, and/or 400 to execute instructions stored on the computer-readable media 122, 210, and/or 402. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 122, 210, and/or 402, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Each of the network interface(s) 228 and network interface(s) 450 may enable communications between the voice-enabled devices 108 and the remote system 110, as well as other networked devices. Such network interface(s) can include one or more network interface controllers (NICs) or other types of transceiver devices to send and receive communications over a network.

For instance, each of the net network interface(s) 228 and network interface(s) 450 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 228 and network interface(s) 450 may include a wide area network (WAN) component to enable communication over a wide area network. The network 118 may represent an array of wired networks, wireless networks, such as WiFi, or combinations thereof.

Figure 4C:
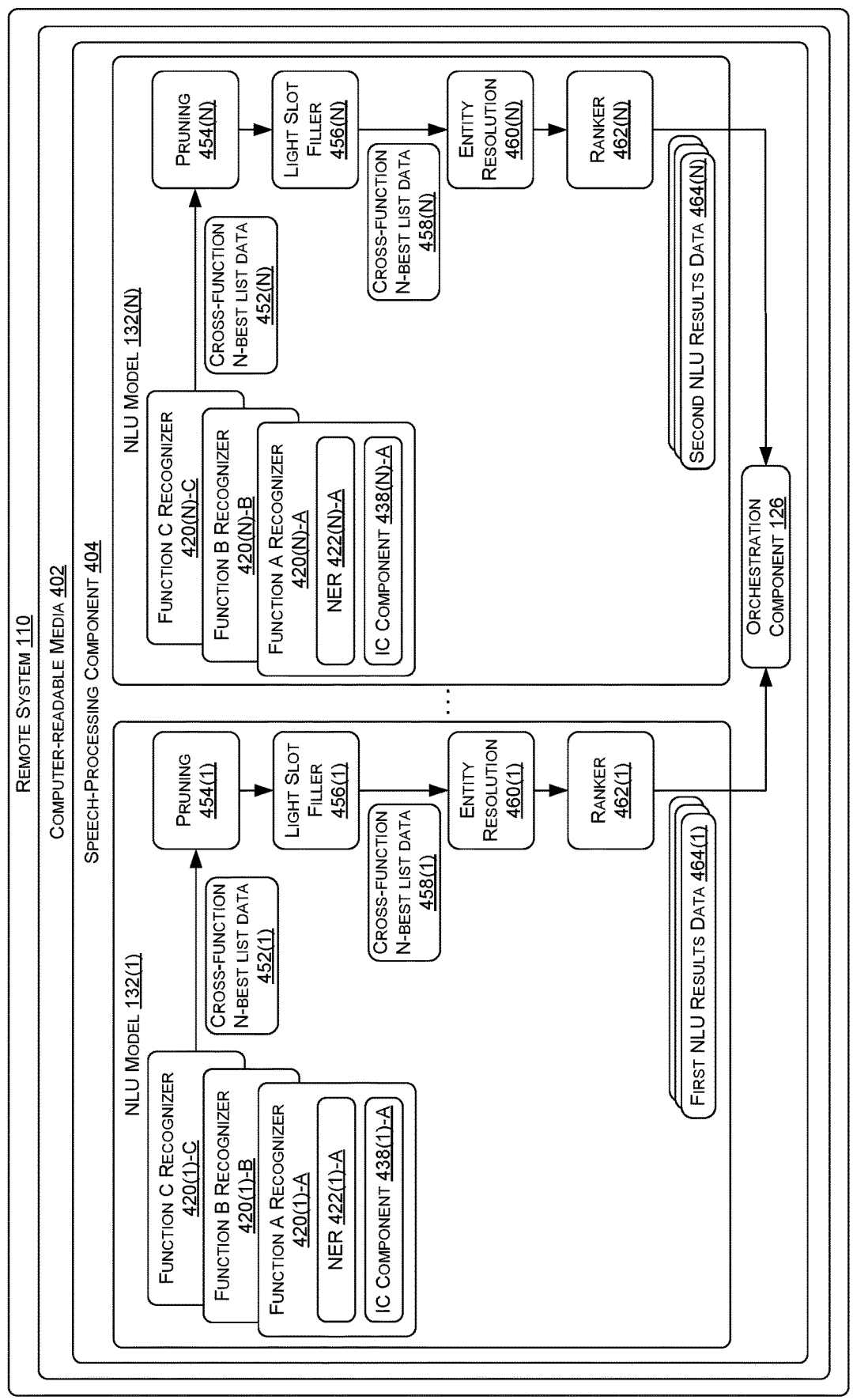
FIG. 4C illustrates a block diagram of an example architecture of a remote system including components and steps for perform natural language processing according to examples of this disclosure.

FIG. 4C illustrates a block diagram of an example architecture of a remote system including components and steps for perform natural language processing according to examples of this disclosure. As illustrated, each of the NLU models 132(1)-132(N) have respective components which may be biased, or trained, to determine intent data 304 based on a device profile associated with the NLU model 132.

Each of the NLU models 132(1)-132(N) may store respective components for determining intent data 304 for device profiles associated with different voice-enabled devices 108(1)-108(N). As illustrated a first NLU model 132(1) may include respective function recognizers 420(1)-A, 420(1)-B, 420(1)-C, etc., which process the text data 302 received by the NLU component 130 from the ASR component 128. Various operations are described below with respect to a first NLU model 132(1). However, the techniques may be applied by each of the NLU models 132(1)-132(N) where "N" is any number greater than 2, and each of the respective NLU modules 132 is associated with a respective device profile for a voice-enabled device 108.

The NLU model 132(1) may compile data, output by each of the recognizers 420(1) that processed the text data 302 input to the NLU model 132(1), into a single N-best list, and may send N-best list data 452(1) (representing the N-best list) to a pruning component 454(1) (as illustrated in FIG. 4C). Each entry in the N-best list data 452(1) may correspond to tagged text output by a different recognizer 420(1). Each entry in the N-best list data 452(1) may be associated with a respective score (e.g., intent confidence score) indicating the tagged text corresponds to the function associated with the recognizer 420(1) from which the tagged text was output. For example, the N-best list data 452(1) may be represented as:

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 454(1) creates a new, shorter N-best list (i.e., represented in N-best list data 458(1) discussed below) based on the N-best list data 452(1). The pruning component 454(1) may sort the tagged text represented in the N-best list data 452(1) according to their respective scores.

The pruning component 454(1) may perform score thresholding with respect to the N-best list data 452(1). For example, the pruning component 454(1) may select entries represented in the N-best list data 452(1) associated with a score satisfying (e.g., meeting and/or exceeding) a score threshold. The pruning component 454(1) may also or alternatively perform number of entry thresholding. For example, the pruning component 454(1) may select the top scoring entry(ies) associated with each different category of function (e.g., music, shopping, communications, etc.) represented in the N-best list data 452(1), with the new N-best list data 458(1) including a total number of entries meeting or falling below a threshold number of entries. The purpose of the pruning component 454(1) is to create a new list of top scoring entries so that downstream, more resource intensive processes may only operate on the tagged text entries that most likely correspond to the user input to the system.

The NLU model 132(1) may also include a respective light slot filler component 456(1). The light slot filler component 456(1) can take text from slots represented in the tagged text entry(ies) output by the pruning component 454(1) and alter it to make the text more easily processed by downstream components. The light slot filler component 456(1) may perform low latency operations that do not involve heavy operations such as reference to a knowledge base. The purpose of the light slot filler component 456(1) is to replace words with other words or values that may be more easily understood by downstream components. For example, if a tagged text entry includes the word "tomorrow," the light slot filler component 456(1) may replace the word "tomorrow" with an actual date for purposes of downstream processing. Similarly, the light slot filler component 456(1) may replace the word "CD" with "album" or the words "compact disc." The replaced words are then included in the N-best list data 458(1).

The NLU model 132(1) sends the N-best list data 458(1) to an entity resolution component 460(1). The entity resolution component 460(1) can apply rules or other instructions to standardize labels or tokens from previous stages into an intent/slot representation. The precise transformation may depend on the function (e.g., for a travel function, the entity resolution component 460(1) may transform a text mention of "Boston airport" to the standard BOS three-letter code referring to the airport). The entity resolution component 460(1) can refer to an authority source (e.g., a knowledge base) that is used to specifically identify the precise entity referred to in each slot of each tagged text entry represented in the N-best list data 458(1). Specific intent/slot combinations may also be tied to a particular source, which may then be used to resolve the text. In the example "play songs by the stones," the entity resolution component 460(1) may reference a personal music catalog, Amazon Music account, user profile (described herein), or the like. The entity resolution component 460(1) may output data including an altered N-best list that is based on the N-best list represented in the N-best list data 458(1), but also includes more detailed information (e.g., entity IDs) about the specific entities mentioned in the slots and/or more detailed slot data that can eventually be used by a function. The NLU model 132(1) may include multiple entity resolution components 460(1) and each entity resolution component 460(1) may be specific to one or more functions.

The entity resolution component 460(1) may not be successful in resolving every entity and filling every slot represented in the N-best list data 458(1). This may result in the entity resolution component 460(1) outputting incomplete results. The NLU model 132(1) may include a ranker component 462(1), which may consider such errors when determining how to rank the tagged text entries for potential execution. For example, if a book function recognizer 420(1) outputs a tagged text entry including a <ReadBook> intent flag, but the entity resolution component 460(1) cannot find a book with a title matching the text of the item, the ranker component 462(1) may re-score that particular tagged text entry to be given a lower score. The ranker component 462(1) may also assign a particular confidence to each tagged text entry input therein. The confidence score of a particular tagged text entry may be affected by whether the tagged text entry has unfilled slots. For example, if a tagged text entry associated with a first function includes slots that are all filled/resolved, that tagged text entry may be associated with a higher confidence than another tagged text entry including at least some slots that are unfilled/unresolved.

The ranker component 462(1) may apply re-scoring, biasing, or other techniques to obtain the most preferred tagged and resolved text entry. To do so, the ranker component 462(1) may consider not only the data output by the entity resolution component 460(1), but may also consider other data. The other data may include a variety of information. For example, the other data may include function rating or popularity data. For example, if one function has a particularly high rating, the final ranker component may increase the score of a tagged text entry(ies) associated with or otherwise invoking that particular function. The other data may also include information about functions that have been specifically enabled by the user. For example, the final ranker component may assign higher scores to tagged text entries associated with or otherwise invoking enabled functions than tagged text entries associated with or otherwise invoking non-enabled functions. User history may also be considered, such as if the user regularly uses a particular function or does so at particular times of day. Date, time, location, weather, type of device 108, user ID, context, and other information may also be considered. For example, the ranker component 462(1) may consider when any particular functions are currently active (e.g., music being played, a game being played, etc.). Following final ranking, the NLU model 132(1) may output first NLU results data 464(1) to the orchestration component 126. The first NLU results data 464(1) may include various entries, with each entry representing an NLU processing confidence score, an intent (e.g., intent data 304), slot data, and a potential skill or speechlet that may operating with respect to the respective entry's data.

As noted above, each of the NLU models 132(1)-132(N) may include components, and perform operations, similar to those described above with respect to NLU model 132(1). However, the components and operations may be biased, or trained differently, based on device capabilities of device profiles associated with the respective NLU models 132(1)-132(N). For instance, an NLU model 132(1) associated with the voice-enabled device 108(1) may include recognizers 420(1) which correspond to different functions than a recognizer 420(N) associated with the NLU model 132(N). As a specific example, a voice-enabled device 108(N) may include or be associated with a display, and is able to perform functions for displaying data. In such examples, a recognizer 420(N) for a device profile of the voice-enabled device 108(N) may include a function for determining video data intents. However, an NLU model 132(1) trained for a device profile associated with a voice-enabled device 108(1) may not include a video display, and may not have a recognizer 420(1) corresponding to a function for determining video data intents. Thus, the NLU models 132(1)-132(N) may include at least one different recognizer 420 for a different function. Further, the pruning components 454(1)-454(N), light slot fillers 456(1)-456(N), entity resolution components 460(1)-460(N), and ranker components 462(1)-462(N) may be biased or trained based on the different functions of the recognizers 420, or the device capabilities of the device profiles for the different voice-enabled devices 108.

Thus, the orchestration component 126 may receive first NLU results data 464(1) which include intent data 304(1) for the voice-enabled device 132(1) that corresponds to a function/capability of the first voice-enabled device 108(1), and the orchestration component 126 may receive second NLU results data 464(N) which include intent data 304(N) for the voice-enabled device 132(N) that corresponds to a function/capability of the first voice-enabled device 108(N), where the first NLU results data 464(1) is different than the second NLU results data 464(N) based on the different capabilities, and device profiles, for each of the NLU models 132(1) and 132(N).

Figure 5A:
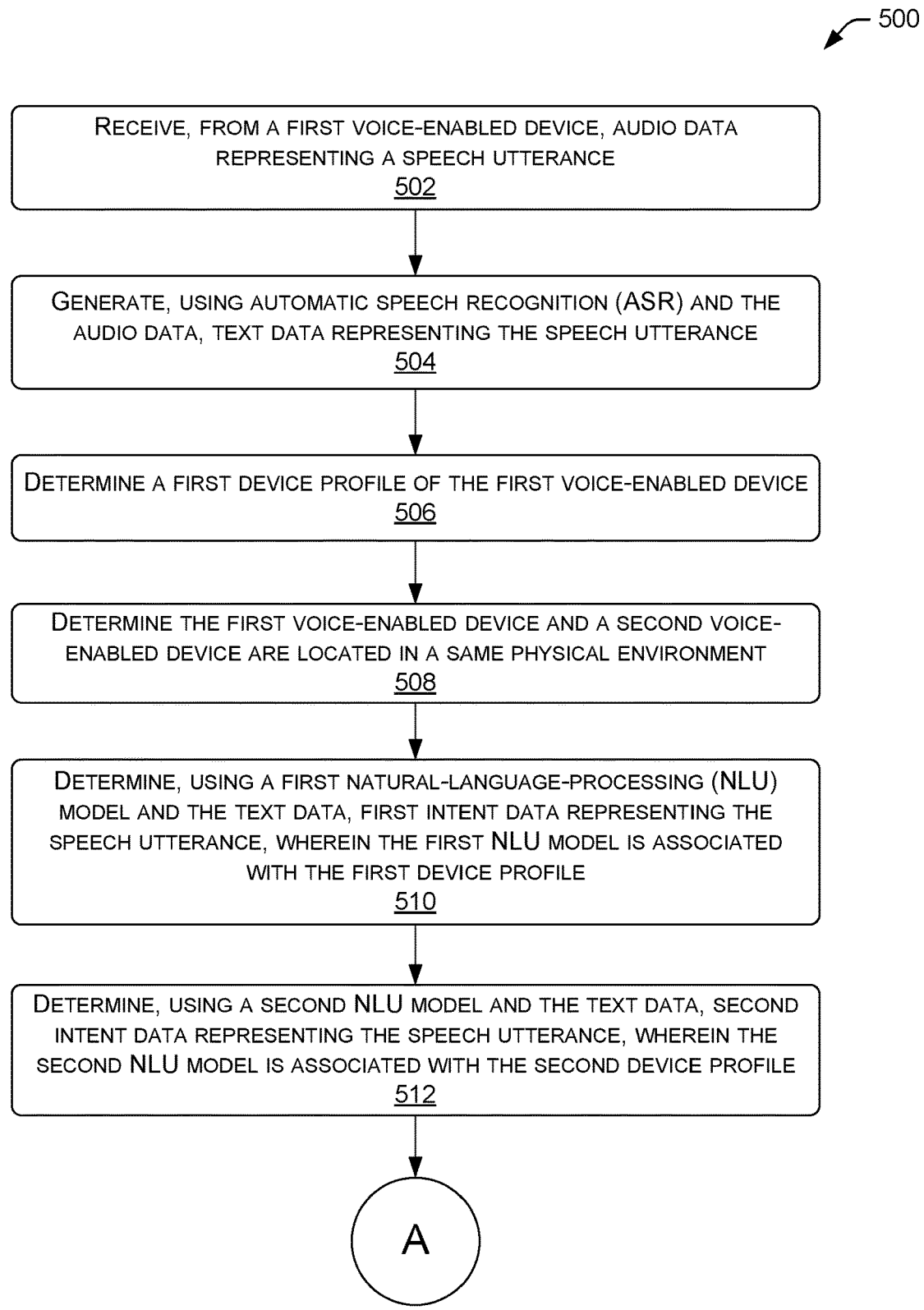
FIGS. 5A and 5B illustrate a flow diagram of an example method for determining, by a remote system, which voice-enabled device from multiple voice-enabled devices is to respond to a speech utterance of a user.
Figure 5B:
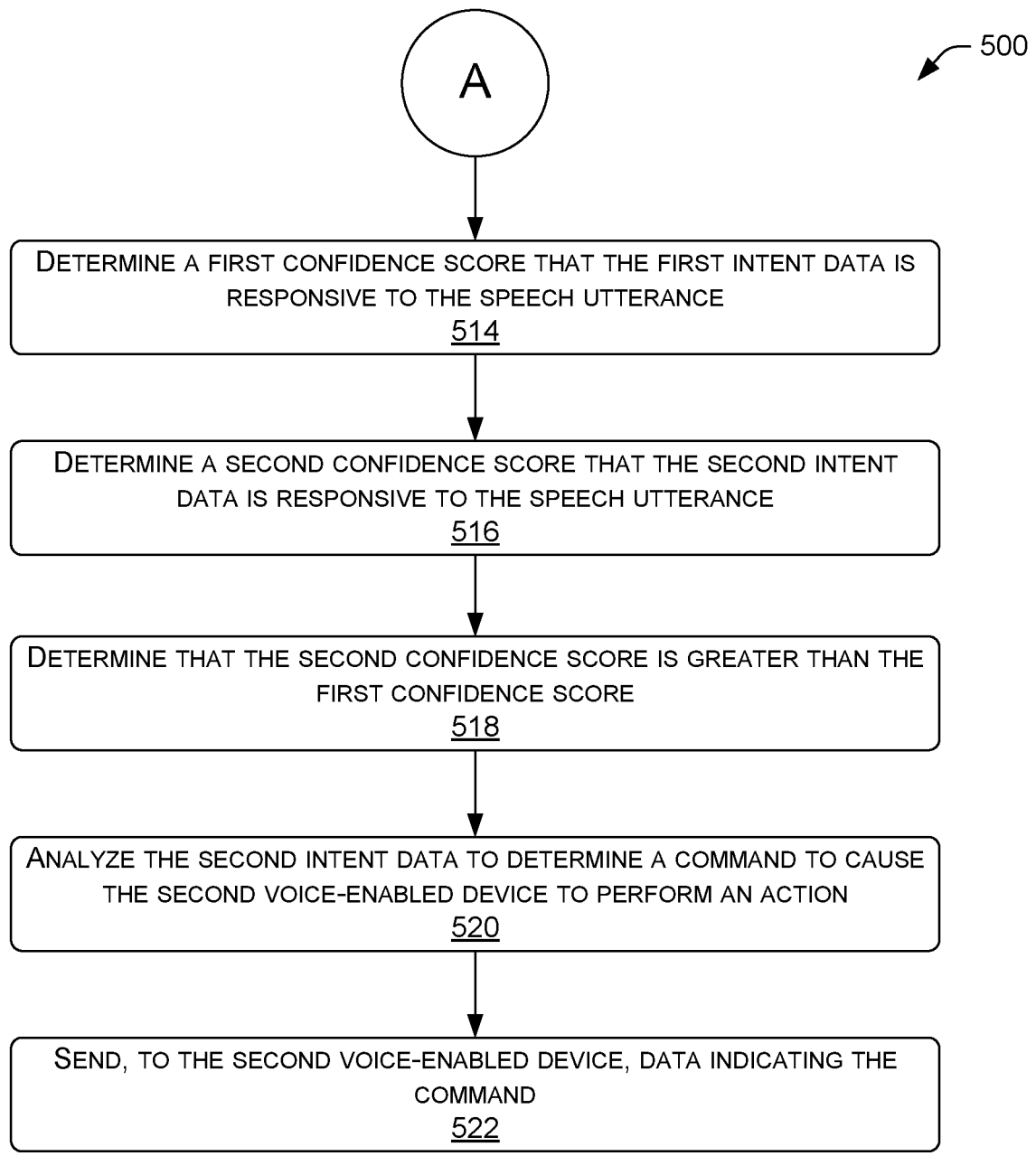

FIGS. 5A and 5B illustrate a flow diagram of an example method 500 for determining, by a remote system 110, which voice-enabled device 108 from multiple voice-enabled devices is to respond to a speech utterance 106 of a user 104. This method (as well as each method described herein, such as methods 600 and 700) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 502, the remote system 110 may receive, from a first voice-enabled device 108(1), audio data 112 representing a speech utterance 106. At 504, ASR component 128 of the remote system 110 may generate, using automatic speech recognition (ASR) and the audio data 112, text data 302 representing the speech utterance 106. At 506, the remote system 110 may determine a first device profile of the first voice-enabled device 108(1). For instance, the orchestration component 126 may analyze the user registry 134 to identify a device ID or profile of the first voice-enabled device 108(1).

At 508, the remote system 110 may determine that the first voice-enabled device and a second voice-enabled device are located in a same physical environment. For example, the remote system 110 may identify an association between the first device profile and a second device profile of a second voice-enabled device 108(2), wherein the association indicates that the first voice-enabled device 108(1) and the second voice-enabled device 108(2) are located in a same physical environment 102. For instance, the orchestration component 126 may analyze the groups 138 stored in the user registry 134 and determine that the device profiles of the first voice-enabled device 108(1) and the second voice-enabled device 108(2) are grouped together and indicated as being in the environment 102.

At 510, the NLU component 130 of the remote system 110 may determine, using a first natural-language-understanding (NLU) model 132(1) and the text data 302, first intent data 304(1) representing the speech utterance 106, wherein the first NLU model 132(1) is associated with the first device profile. In some examples, the first NLU model 132(1) may comprise a first machine-learning model trained to determine that the first intent data 304(1) corresponds to the text data 302, wherein the first intent data 304(1) is associated with a first device capability (e.g., streamlining music, shopping list updating, etc.) of the first voice-enabled device 108(1).

At 512, the NLU component 130 of the remote system 110 may determine, using a second NLU model 132(2) and the text data 302, second intent data 304(2) representing the speech utterance 106, wherein the second NLU model 132(2) is associated with the second device profile. In some examples, the second NLU model 132(2) comprises a second machine-learning model trained to determine that the second intent data 304(2) corresponds to the text data 302, wherein the second intent data 304(2) is associated with a second device capability (e.g., controlling a display device, controlling a speaker, etc.) of the second voice-enabled device 108(2), and wherein the first device capability is different than the second device capability.

At 514, the targeting-determination component 140 may determine a first confidence score that the speech utterance 106 corresponds to the first intent data 304(1). In some examples, the targeting-determination component 140 may identify first device-state data (e.g., idle state, streamlining music state, shopping session state, etc.) from the device states 136 associated with the first voice-enabled device 108(1), and determine the first confidence score is based at least in part on the first device-state data 136.

Further, other types of data may be used to determine the first confidence score that the speech utterance 106 corresponds to the first intent data 304(1). For example, intent confidence scores determined by the IC component 438 may be utilized to determine the first confidence score. As an example, if the if the words, order of the words, proximity of the words, etc., of the text data determined using ASR match well with a framework of slots/fields for the determined intent data 304(1) of the domain intents 430, the intent confidence score for the corresponding intent may be a higher intent confidence score (e.g., 80%, 90%, etc.). Conversely, if the words, order of the words, proximity of the words, etc., do not match well with a framework of slots/fields for the determined intent data 304(1) of the domain intents 430, the intent confidence score determined by the IC component 438 may be relatively low (e.g., 20%, 30%, etc.), and thus lower the first confidence score that the speech utterance 106 corresponds to the first intent data 304(1).

In further examples, the device capabilities of the voice-enabled device 108(1) may be utilized to determine the first confidence score that the speech utterance 106 corresponds to the first intent data 304(1). For example, if the first intent data 304(1) corresponds to a device compatibility (e.g., output video data) that the voice-enabled device 108(1) does not have, then the first confidence score that the speech utterance 106 corresponds to the first intent data 304(1) may be lower compared to if the first intent data 304(1) corresponds to a device capability (e.g., shopping device capability) that the voice-enabled device 108(1) does have.

In even further examples, device state data 136 may be utilized to determine configured scores that the speech utterance 106 corresponds to the first intent data 304(1). For instance, the targeting-determination component 140 may identify, from the user registry 134, first device-state data associated with the first voice-enabled device 108(1). In some examples, the first device-state data indicates that a first, current device state of the first voice-enabled device is, for example, "idle" (e.g., listening for a wake word, but otherwise in a low power mode), or "active" (e.g., streamlining video, outputting audio, etc.) The targeting-determination component 140 may determine the first confidence score by determining that the first intent data corresponds to a first action (e.g., lowering the volume, changing the channel, etc.) that the first voice-enabled device 108(1) is able, or unable, to perform in the first device state. For instance, the confidence score may be lower if the first voice-enabled device 108(1) is in the idle state, and the first action is to lower volume. Conversely, the confidence score may be higher if the first device-state data indicates first voice-enabled device 108(1) is outputting audio and if the intent data to a first action of lowering the volume.

At 516, the targeting-determination component 140 may determine a second confidence score that the speech utterance 106 corresponds to the second intent data 304(2). In some examples, the targeting-determination component 140 may identify second device-state data (e.g., idle state, streamlining movie state, controlling a speaker state, etc.) from the device states 136 associated with the second voice-enabled device 108(2), and determine the second confidence score is based at least in part on the second device-state data 136. Similar to the techniques discussed at 514, the targeting-determination component 140 may additionally, or alternatively, determine the second confidence score that the speech utterance 106 corresponds to the second intent data 304(2) based on other data, such as intent confidence scores and/or device capabilities of the voice-enabled device 108(2).

At 518, the targeting-determination component 140 of the remote system 110 may determine that the second confidence score is greater than the first confidence score. At 520, based at least in part on the second confidence score being greater than the first confidence score, the command processor 142 may use the second intent data 304(2) to determine a command to cause the second voice-enabled device to perform an action. At 522, the remote system 110 may send, to the second voice-enabled device 108(2), data (e.g., response 144) indicating the command.

In some examples, at a time prior to receiving the first audio data, the remote system 110 may receive, at a first time and from the first voice-enabled device 108(1), second audio data 112 representing first sound captured by one or more microphones of the first voice-enabled device 108(1). Further, the remote system 110 may receive, at a second time and from the second voice-enabled device 108(2), third audio data 112 representing second sound captured by one or more microphones of the second voice-enabled device 108(2). The remote system 110 may determine the first time and the second time are within a threshold period of time (e.g., 1 second, 5 seconds, etc.) from each other, which may indicate that the two devices 108 captured the same utterance in the same environment 102. The remote system may, based at least in part on the second audio data and the third audio both being received within the threshold period of time, store the association, or grouping 138, between the first device profile and the second device profile indicating that the first voice-enabled device 108(1) is in the same physical environment 102 as the second voice-enabled device 108(2).

Figure 6:
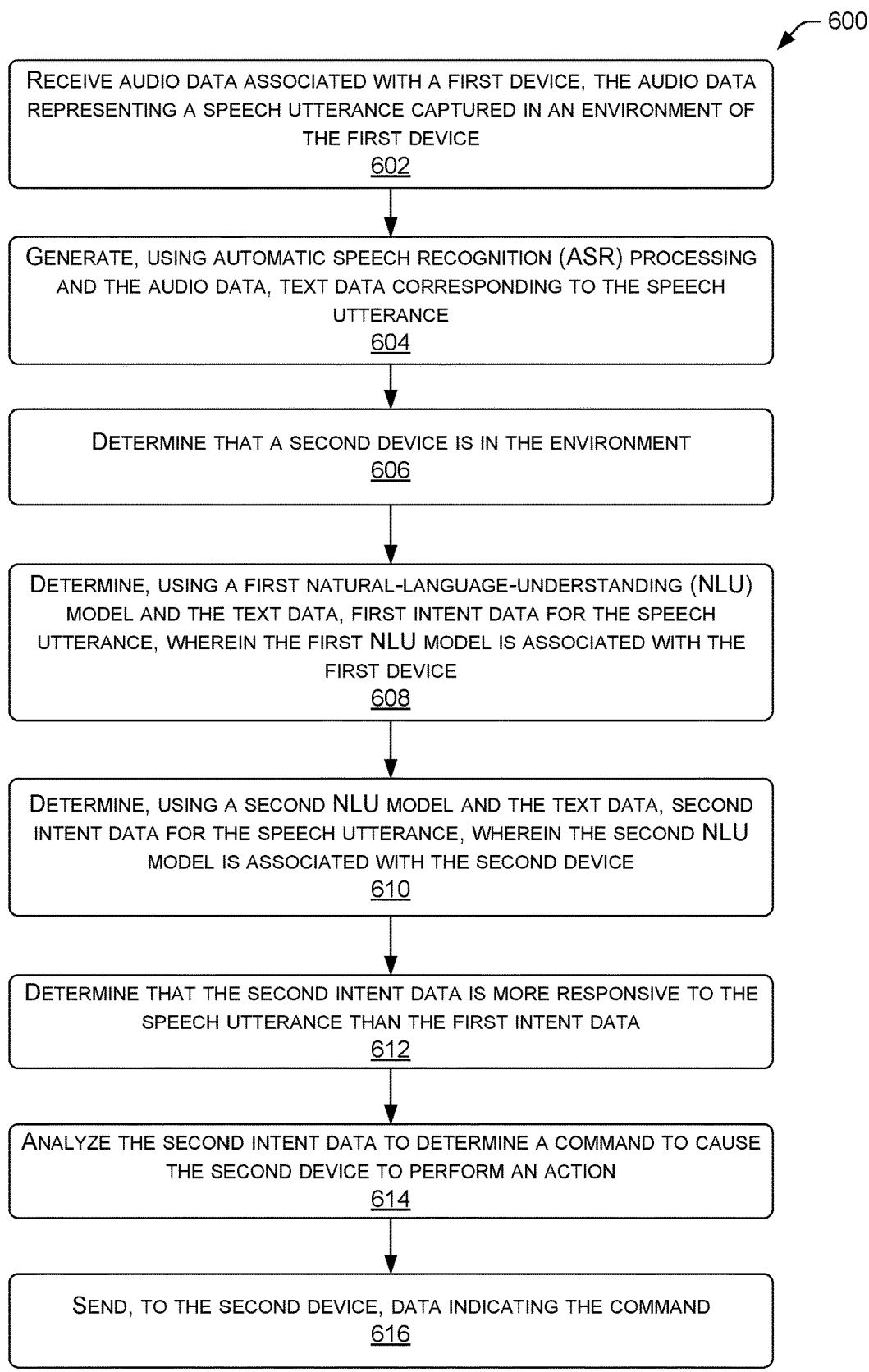
FIG. 6 illustrates a flow diagram of another example method for determining, by a remote system, which voice-enabled device from multiple voice-enabled devices is to respond to a speech utterance of a user.

FIG. 6 illustrates a flow diagram of another example method 600 for determining, by a remote system 110, which voice-enabled device 108 from multiple voice-enabled devices 108 is to respond to a speech utterance 106 of a user 104.

At 602, the remote system 110 may receive, from a first device 108(1), audio data 112 representing a speech utterance 106 captured in an environment 102 of the first device 108(1). At 604, ASR component 128 of the remote system 110 may generate, using automatic speech recognition (ASR) processing and the audio data 112, text data 302 corresponding to the speech utterance 106. At 606, the remote system 110 may determine that a second device 108(2) is in the environment 102 of the first device 108(1). For instance, the orchestration component 126 may analyze the user registry 134 to identify a device ID or profile of the first device 108(1). Further, the remote system 110 may identify an association between the first device profile and a second device profile of a second 108(2), wherein the association indicates that the first device 108(1) and the second device 108(2) are located in a same physical environment 102. For instance, the orchestration component 126 may analyze the groups 138 stored in the user registry 134 and determine that the device profiles of the first device 108(1) and the second device 108(2) are grouped together and indicated as being in the environment 102.

At 608, the NLU component 130 of the remote system 110 may determine, using a first natural-language-understanding (NLU) model 132(1) and the text data 302, first intent data 304(1) for the speech utterance 106, wherein the first NLU model 132(1) is associated with the first device 108(1). In some examples, the first NLU model 132(1) may comprise a first machine-learning model trained to determine that the first intent data 304(1) corresponds to the text data 302, wherein the first intent data 304(1) is associated with a first device capability (e.g., streamlining music, shopping list updating, etc.) of the first device 108(1).

At 610, the NLU component 130 of the remote system 110 may determine, using a second natural-language-understanding (NLU) model 132(2) and the text data 302, second intent data 304(2) for the speech utterance 106, wherein the second NLU model 132(2) is associated with the second device 108(2). In some examples, the second NLU model 132(2) comprises a second machine-learning model trained to determine that the second intent data 304(2) corresponds to the text data 302, wherein the second intent data 304(2) is associated with a second device capability (e.g., controlling a display device, controlling a speaker, etc.) of the second voice-enabled device 108(2), and wherein the first device capability is different than the second device capability.

At 612, the remote system 110 may determine that the second intent data 304(2) is more responsive to the speech utterance 106 than the first intent data 304(2). In some examples, the remote system 110 may identify first device-state data 136 associated with the first device 108(1), and determine a first confidence score that the speech utterance 106 corresponds to the first intent data 304(2) based at least in part on the first device-state data 136. Further, the remote system may identify second device-state data 304(2) associated with the second device 108(2), and determine a second confidence score that the speech utterance 106 corresponds to the second intent data 304(2) based at least in part on the second device-state data 136. The remote system may then determine that the second confidence score is greater than the first confidence score. In various examples, the audio data may comprise first audio data, and the remote system 110 may receive second audio data 112 associated with the second device 108(2), where the second audio data 112 also represents the speech utterance 106. The remote system may determine a first signal-to-noise (SNR) value associated with the first audio data 112 of the first device 108(1), and further determine a second SNR value associated with the second audio data 112 of the second device 108(2). The remote system may determine a first confidence score that the speech utterance 106 corresponds to the first intent data 304(1) based at least in part on the first SNR value, and also determine a second confidence score that the speech utterance 106 corresponds to the second intent data 304(2) based at least in part on the second SNR value. The remote system 110 may determine that the second confidence score is greater than the first confidence score.

In some examples, the remote system 110 may determine that the second intent data 304(2) is more responsive to the speech utterance 106 than the first intent data 304(2) based on intent confidence scores for the first intent data 304(1)

and the second intent data 304(2). For instance, the remote system 110 may determine, at least partly using the first NLU model and the text data, a first intent confidence scores that the first intent data is associated with the text data. Further, the remote system 110 may determine, at least partly using the second NLU model and the text data, a second intent confidence score that the second intent data is associated with the text data. In such examples, determining that the second intent data is more responsive to the speech utterance than the first intent data may be based at least in part on the first intent confidence score and the second intent confidence score. For instance, the second intent confidence scores may be greater than the first intent confidence score. The use of intent confidence scores may be utilized in addition to, or as an alternative to, other types of data (e.g., device states, device capabilities, SNR values, etc.) for determining that the second intent data is more responsive to the speech utterance than the first intent data.

At 614, the command processor 142 of the remote system 110 may analyze the second intent data 304(2) to determine a command to cause the second device 108(2) to perform an action. Further, at 616, the remote system 110 may send, to the second device 108(2), data (e.g., response 144) indicating the command.

In various examples, the remote system 110 may use device profiles of the first device 108(1) and the second device 108(2) to identify appropriate NLU models 132. For instance, the remote system 110 may identify a first device profile associated with the first device 108(1), and determine that the first device profile is associated with the first NLU model 132(1). The first NLU model 132(1) may comprise a first machine-learning model trained to identify a first plurality of intents as being responsive to input text data 302. In such examples, each of the first plurality of intents are associated with a first device capability of the first device 108(1). Similarly, the remote system 110 may identify a second device profile associated with the second device 108(2), and determine that the second device profile is associated with the second NLU model 132(2). The second NLU model 132(2) may comprise a second machine-learning model trained to identify a second plurality of intents as being responsive to input text data 302. In such examples, each of the second plurality of intents are associated with a second device capability of the second device 108(2).

Although the techniques described in methods 500 and 600 describe the second intent data 304(2) as having higher confidence scores than the first intent data 304(1), in other examples, the first intent data 304(1) may have a higher confidence score than the second intent data 304(2). In such examples, the command processor 142 may analyze the first intent data 304(1) to determine a command, and send data representing the command to the first device 108.

Figure 7:
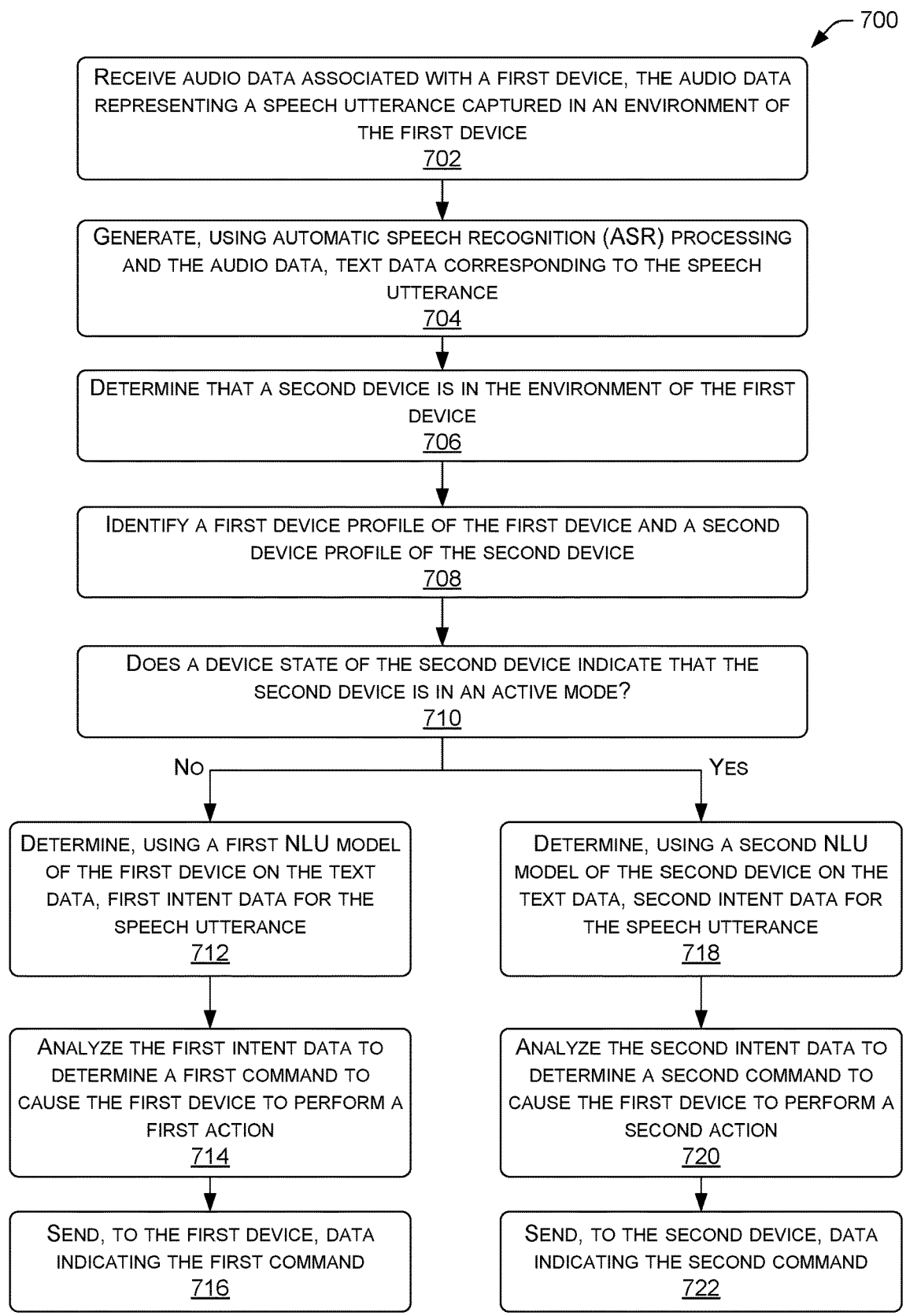
FIG. 7 illustrates a flow diagram of another example method for performing another example of bifurcated processing on an audio signal representing a speech utterance of a user to determine a voice-enabled device to respond to the speech utterance.

FIG. 7 illustrates a flow diagram of another example method 700 for performing another example of bifurcated processing on an audio signal 112 representing a speech utterance 106 of a user 104 to determine a voice-enabled device 108 to respond to the speech utterance 106.

At 702, the remote system may receive, from a first device 108(1), audio data 112 representing a speech utterance 106 captured in an environment 102 of the first device 108(1). At 704, ASR component 128 of the remote system 110 may generate, using automatic speech recognition (ASR) processing and the audio data 112, text data 302 corresponding to the speech utterance 106.

At 706, the remote system 110 may determine that a second device 108(2) is in the environment 102 of the first device 108(1). For instance, the orchestration component 126 may, at 708, analyze the user registry 134 to identify a device ID or profile of the first device 108(1). Further, the remote system 110 may identify an association between the first device profile and a second device profile of a second 108(2), wherein the association indicates that the first device 108(1) and the second device 108(2) are located in a same physical environment 102. For instance, the orchestration component 126 may analyze the groups 138 stored in the user registry 134 and determine that the device profiles of the first device 108(1) and the second device 108(2) are grouped together and indicated as being in the environment 102.

At 710, the remote system may determine whether a device state of the second device 108(2) indicates that the second device 108(2) is in an active mode (e.g., streaming music data, streaming video data, controlling a secondary device, etc.)

If the remote system 110 determines that the second device is not in an active state, and is instead in an idle state, the remote system may, at 712, determine, using a first natural-language-understanding (NLU) model 132(1) and the text data 302, first intent data 304(1) for the speech utterance 106, wherein the first NLU model 132(1) is associated with the first device 108(1). In some examples, the first NLU model 132(1) may comprise a first machine-learning model trained to determine that the first intent data 304(1) corresponds to the text data 302, wherein the first intent data 304(1) is associated with a first device capability (e.g., streamlining music, shopping list updating, etc.) of the first device 108(1).

Further, if the remote system 110 determines that the second device is not in an active state, and is instead in an idle state, the remote system may, at 714, analyze the first intent data 304(1) to determine a first command to cause the first device 108(1) to perform a first action. At 716, the remote system 110 may send, to the first device 108(1), data indicating the first command.

However, if the remote system 110 determines at 710 that the second device 108(2) is in an active mode, the remote system 110 may, at 718, determine, using a second natural-language-understanding (NLU) model 132(2) and the text data 302, second intent data 304(2) for the speech utterance 106, wherein the second NLU model 132(2) is associated with the second device 108(2).

Further, if the remote system 110 determines at 710 that the second device 108(2) is in an active mode, the remote system 110 may, at 720, analyze the second intent data 304(2) to determine a command to cause the second device 108(2) to perform an action. Further, at 722, the remote system 110 may send, to the second device 108(2), data (e.g., response 144) indicating the command.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving at one or more network devices, audio data representing a speech utterance in an environment of a first device, wherein the one or more network devices are remote from the environment of the first device;
   determining, using a first natural-language-understanding (NLU) model stored at the one or more network devices, first intent data representing the speech utterance, wherein the first NLU model is associated with the first device;
   determining, using a second NLU model stored at the one or more network devices, second intent data representing the speech utterance, wherein the second NLU model is associated with a second device;
   selecting, at the one or more network devices, the second intent data instead of the first intent data;
   using the second intent data to determine, at the one or more network devices, a command to cause the second device to perform an action; and
   sending, from the one or more network devices and to the second device, command data indicating the command.

2. The method of claim 1, wherein:
   the first NLU model comprises a first machine-learning model trained to determine that the first intent data represents the speech utterance;
   the first intent data is associated with a first device capability of the first device;
   the second NLU model comprises a second machine-learning model trained to determine that the second intent data represents the speech utterance; and
   the second intent data is associated with a second device capability of the second device, the second device capability being different than the first device capability.

3. The method of claim 1, further comprising:
   identifying first device-state data associated with the first device, wherein the first device-state data indicates a first device state of the first device;
   determining a first confidence score that the speech utterance corresponds to the first intent data by determining that the first intent data corresponds to a first action that the first device is unable to perform in the first device state;
   identifying second device-state data associated with the second device, wherein the second device-state data indicates a second device state of the second device;
   determining a second confidence score that the speech utterance corresponds to the second intent data by determining that the second intent data corresponds to a second action that the second device is able to perform in the second device state; and
   determining that the second confidence score is greater than the first confidence score.

4. The method of claim 1, further comprising:
   determining, using automatic speech recognition (ASR) processing and the audio data, text data representing the speech utterance;
   determining, at least partly using the first NLU model and the text data, a first intent confidence score that the first intent data is associated with the text data;
   determining, at least partly using the second NLU model and the text data, a second intent confidence score that the second intent data is associated with the text data; and
   determining that the second intent data is more responsive to the speech utterance than the first intent data based at least in part on the first intent confidence score and the second intent confidence score.

5. The method of claim 1, wherein the audio data comprises first audio data, and the method further comprising:
   receiving second audio data associated with the second device, the second audio data representing the speech utterance;
   determining a first signal-to-noise (SNR) value associated with the first audio data;
   determining a second SNR value associated with the second audio data;
   determining a first confidence score that the speech utterance is better represented by the first intent data based at least in part on the first SNR value;
   determining a second confidence score that the speech utterance is better represented by the second intent data based at least in part on the second SNR value; and
   determining that the second confidence score is greater than the first confidence score.

6. The method of claim 1, wherein the audio data comprises first audio data, and the method further comprising, prior to receiving the first audio data:
   receiving, from the first device, second audio data representing first sound captured by one or more microphones of the first device;
   receiving, from the second device, third audio data representing second sound captured by one or more microphones of the second device;
   determining that the second audio data was received within a threshold period of time of when the third audio data was received; and
   based at least in part on the second audio data and the third audio both being received within the threshold period of time, generating an association between a first device profile of the first device and a second device profile of the second device, wherein the association indicates that the first device is in the environment of the second device.

7. A system comprising:
   one or more processors; and
   one or more computer-readable media storing computer executable instructions that, when executed by the one or more processors, cause the one or more processors to perform operations comprising:
      receiving audio data generated by one or more microphones of a first device and representing a speech utterance in an environment of the first device;
      determining that a second device is in the environment of the first device, wherein the second device did not perform speech processing on the audio data;
      determining, using a first model, first intent data representing the speech utterance, wherein the first model is associated with the first device;
      determining, using a second model, second intent data representing the speech utterance, wherein the second model is associated with the second device;
      selecting the second intent data instead of the first intent data;
      using the second intent data to determine a command to cause the second device to perform an action; and
      based at least in part on the second device being in the environment of the first device, sending, to the second device, command data indicating the command.

8. The system of claim 7, the operations further comprising identifying an association between the first device and the second device indicating that the second device is in the environment of the first device.

9. The system of claim 7, wherein:
the first model comprises a first machine-learning model trained to determine that the first intent data represents the speech utterance; and
the first intent data is associated with a first device capability of the first device;
the second model comprises a second machine-learning model trained to determine that the second intent data represents the speech utterance; and
the second intent data is associated with a second device capability of the second device, the second device capability being different than the first device capability.

10. The system of claim 7, the operations further comprising:
identifying first device-state data associated with the first device, wherein the first device-state data indicates a first device state of the first device;
determining a first confidence score that the speech utterance corresponds to the first intent data by determining that the first intent data corresponds to a first action that the first device is unable to perform in the first device state;
identifying second device-state data associated with the second device, wherein the second device-state data indicates a second device state of the second device;
determining a second confidence score that the speech utterance corresponds to the second intent data by determining that the second intent data corresponds to a second action that the second device is able to perform in the second device state; and
determining that the second confidence score is greater than the first confidence score.

11. The system of claim 7, the operations further comprising:
determining, using automatic speech recognition (ASR) processing and the audio data, text data representing the speech utterance;
determining, at least partly using the first model and the text data, a first intent confidence score that the first intent data is associated with the text data;
determining, at least partly using the second model and the text data, a second intent confidence score that the second intent data is associated with the text data; and
determining that the second intent data is more responsive to the speech utterance than the first intent data based at least in part on the first intent confidence score and the second intent confidence score.

12. The system of claim 7, wherein the audio data comprises first audio data, and the operations further comprising:
receiving second audio data associated with the second device, the second audio data representing the speech utterance;
determining a first signal-to-noise (SNR) value associated with the first audio data;
determining a second SNR value associated with the second audio data;
determining a first confidence score that the speech utterance is better represented by the first intent data based at least in part on the first SNR value;
determining a second confidence score that the speech utterance is better represented by the second intent data based at least in part on the second SNR value; and determining that the second confidence score is greater than the first confidence score.

13. The system of claim 7, wherein the audio data comprises first audio data, and the operations further comprising, prior to receiving the first audio data:
receiving, from the first device, second audio data representing first sound captured by the one or more microphones of the first device;
receiving, from the second device, third audio data representing second sound captured by one or more microphones of the second device;
determining that the second audio data was received within a threshold period of time of when the third audio data was received; and
based at least in part on the second audio data and the third audio both being received within the threshold period of time, generating an association between a first device profile of the first device and a second device profile of the second device, wherein the association indicates that the first device is in the environment of the second device.

14. A method comprising:
receiving audio data representing a speech utterance in an environment of a first device;
determining that a second device is in the environment of the first device;
determining, using a first model associated with a first device capability of the first device, first intent data representing the speech utterance, wherein the first intent data is usable to determine a first command for the first device to perform a first action associated with the first device capability;
determining, using a second model associated with a second device capability of the second device, second intent data representing the speech utterance, wherein the second intent data is usable to determine a second command for the second device to perform a second action associated with the second device capability;
selecting the first intent data instead of the second intent data;
using the first intent data to determine the second command to cause the second device to perform the second action, wherein the first device is unable to perform the second action; and
sending, to the first device, command data indicating the second command.

15. The method of claim 14, wherein:
the first model comprises a first machine-learning model trained to determine that the first intent data represents the speech utterance;
the first intent data is associated with the first device capability of the first device;
the second model comprises a second machine-learning model trained to determine that the second intent data represents the speech utterance; and
the second intent data is associated with the second device capability of the second device, the second device capability being different than the first device capability.

16. The method of claim 14, further comprising:
identifying first device-state data associated with the first device, wherein the first device-state data indicates a first device state of the first device;
determining a first confidence score that the speech utterance corresponds to the first intent data by determining that the first intent data corresponds to the first action that the first device is able to perform in the first device state;

identifying second device-state data associated with the second device, wherein the second device-state data indicates a second device state of the second device;

determining a second confidence score that the speech utterance corresponds to the second intent data by determining that the second intent data corresponds to the second action that the second device is unable to perform in the second device state; and determining that the first confidence score is greater than the second confidence score.

17. The method of claim 14, further comprising:

determining, using automatic speech recognition (ASR) processing and the audio data, text data representing the speech utterance;

determining, at least partly using the first model and the text data, a first intent confidence score that the first intent data is associated with the text data;

determining, at least partly using the second model and the text data, a second intent confidence score that the second intent data is associated with the text data; and determining that the first intent data is more responsive to the speech utterance than the second intent data based at least in part on the first intent confidence score and the second intent confidence score.

18. The method of claim 14, wherein the audio data comprises first audio data, and the method further comprising:

receiving second audio data associated with the second device, the second audio data representing the speech utterance;

determining a first signal-to-noise (SNR) value associated with the first audio data;

determining a second SNR value associated with the second audio data;

determining a first confidence score that the speech utterance is better represented by the first intent data based at least in part on the first SNR value;

determining a second confidence score that the speech utterance is better represented by the second intent data based at least in part on the second SNR value; and determining that the first confidence score is greater than the second confidence score.

19. The method of claim 14, wherein the audio data comprises first audio data, and the method further comprising, prior to receiving the first audio data:

receiving, from the first device, second audio data representing first sound captured by one or more microphones of the first device;

receiving, from the second device, third audio data representing second sound captured by one or more microphones of the second device;

determining that the second audio data was received within a threshold period of time of when the third audio data was received; and based at least in part on the second audio data and the third audio both being received within the threshold period of time, generating an association between a first device profile of the first device and a second device profile of the second device, wherein the association indicates that the first device is in the environment of the second device.

20. The method of claim 14, wherein the command comprises a first command, and the method further comprising, based at least in part on determining that the second device is in the environment of the first device:

storing an association between a first device profile of the first device and a second device profile of the second device;

generating a second command to cause the second device to refrain from detecting speech; and sending the second command to the second device.

* * * * *